US008250214B2

(12) United States Patent
Susai et al.

(10) Patent No.: US 8,250,214 B2
(45) Date of Patent: Aug. 21, 2012

(54) SYSTEM, METHOD AND COMPUTER PROGRAM PRODUCT FOR COMMUNICATING WITH A PRIVATE NETWORK

(75) Inventors: Michel Susai, San Jose, CA (US); Ritesh Agrawal, Navi-Mumbai (IN); Uday Masuraker, Thane (IN)

(73) Assignee: VMware, Inc., Palo Alto, CA (US)

( * ) Notice: Subject to any disclaimer, the term of this patent is extended or adjusted under 35 U.S.C. 154(b) by 1491 days.

(21) Appl. No.: 11/019,956

(22) Filed: Dec. 20, 2004

(65) Prior Publication Data

US 2006/0245414 A1 Nov. 2, 2006

(51) Int. Cl.
*G06F 15/16* (2006.01)
(52) U.S. Cl. ...................................................... 709/227
(58) Field of Classification Search .................... 709/227
See application file for complete search history.

(56) References Cited

U.S. PATENT DOCUMENTS

| 7,890,751 | B1 * | 2/2011 | Morris et al. | 713/156 |
| 2002/0103857 | A1 * | 8/2002 | Soderberg et al. | 709/203 |
| 2003/0081783 | A1 * | 5/2003 | Adusumilli et al. | 380/270 |
| 2003/0167223 | A1 * | 9/2003 | Pledereder et al. | 705/37 |
| 2003/0167403 | A1 * | 9/2003 | McCurley et al. | 713/201 |
| 2004/0123150 | A1 * | 6/2004 | Wright et al. | 713/201 |
| 2004/0268121 | A1 * | 12/2004 | Shelest et al. | 713/156 |

FOREIGN PATENT DOCUMENTS

WO WO03105005 A1 * 12/2003

OTHER PUBLICATIONS

Freier et al., "The SSL Protocol Version 3.0", Transport Layer Security Working Group, Nov. 18, 1996.*
Weixing et al., "A policy-based security model for Web system", Communication Technology Proceedings, 2003. ICCT 2003. International Conference on vol. 1, Apr. 9-11, 2003 pp. 187-191 vol. 1.*
Stephen Thomas, SSL and TLS Essentials: Securing the Web, John Wiley & Sons, Inc. (2000) p. 68.

* cited by examiner

*Primary Examiner* — William Goodchild

(57) ABSTRACT

A system, method and computer program product for communicating with a private network are described. An application of a client is monitored for communications intended for a node coupled to a private network. A communication from the monitored application of the client that is intended for the node may then be intercepted before the communication can be received by the transport layer of the client, the intercepted communication may then be sent with a connection identifier to an interface unit coupled to the private network via an established network connection over a public network. The connection identifier also associated with a communication link that is established over the private network between the interface unit and the node. The interface unit uses the connection identifier that is received with the communication to identify the associated communication link over the private network. The interface unit may then send the communication (without the connection identifier) to the node via the identified associated communication link.

46 Claims, 17 Drawing Sheets

SYSTEM, METHOD AND COMPUTER PROGRAM PRODUCT FOR COMMUNICATING WITH A PRIVATE NETWORK

TECHNICAL FIELD

Embodiments of the invention relate to communicating with a network and more particularly, for increasing the performance of remote client accessing a private network resource using an interface unit where the tunneling session between client and interface unit is over TCP/IP.

BACKGROUND

A virtual private network (VPN) is a way to use a public network infrastructure, such as the Internet, to provide remote offices or individual users with secure access to their organization's network. A virtual private network may be contrasted with an expensive system of owned or leased lines that can only be used by one organization. One goal of a VPN is to provide the organization with the same capabilities, but at a much lower cost.

A VPN works by using the shared public infrastructure while maintaining privacy through security procedures and tunneling protocols such as the Layer Two Tunneling Protocol (L2TP). In effect, the protocols, by encrypting data at the sending end and decrypting it at the receiving end, send the data through a "tunnel" that cannot be "entered" by data that is not properly encrypted. An additional level of security involves encrypting not only the data, but also the originating and receiving network addresses.

Older tunneling protocol and encryption protocol has limitation regarding network address translation, firewall, management, and control of policy. So, people started using secure socket layer (SSL) based VPN, which uses TCP/IP as network medium to transfer the secure data over Internet to the private network. However, the SSL based Virtual Private Networks (VPN) implement application layer security (layer 5 and above) at layer 3. Security protocols above layer 4 allow the applications to have knowledge of these policies, which are otherwise transparent at layer 3. The current VPN implementation allows fat clients such as, for example, email, ftp, web browsers, telnet etc. to have secure access to subnets behind a VPN SSL gateway/firewall. The current implementation employs TCP-over-TCP. The IP packets (with TCP payload) are looped back for SSL processing. The SSL writes happen over a TCP socket. As a result, the application data goes over a TCP-over-TCP connection.

Unfortunately, the TCP-over-TCP implementation does not efficiently handle the TCP traffic over the secure tunnel. The requirements of the high performance VPN solution are not met by a TCP-over-TCP implementation because a protocol ensuring reliability (TCP) is riding over a reliable protocol (TCP). The TCP-over-TCP implementation is also not very graceful and has an inherent design issue: if the innermost TCP link suffers frequent packet loss, the lower layer TCP queues up a retransmission and increase its timeouts. Since the connection is blocked for this amount of time, the upper layer (i.e. payload) TCP won't get a timely ACK, and will also queue a retransmission. Because the timeout is still less than the lower layer timeout, the upper layer will queue up more retransmissions faster than the lower layer can process them. This makes the upper layer TCP connection stall very quickly and every retransmission just adds to the problem—which can lead to an internal meltdown for the entire system. As a result, the current implementation of application data flowing on a TCP-over-TCP connection is not graceful and could fail when the network is busy or slow with respect to the TCP timer values.

SUMMARY

Embodiments of a system, method and computer program product for communicating with a private network are described. In one embodiment, a communication system may be implemented that includes a private network, a node coupled to the private network and a public network. The system may also include an interface unit coupled to the public network and the private network. The system may further include a client having an application that is capable of issuing a request for initiating a communication with the private network/node. An agent or hook may also reside on the client. The hook may establish a network connection with the interface unit over the public network. The agent may also be capable of intercepting requests from the application before the request can be received by a transport layer of the client. The agent may then send the request to the interface unit via the established network connection. In such an embodiment, the interface unit may attempt to establish a communication link with the node over the private network after receiving the request. Once the interface unit establishes a communication link with the node over the private network in response to receiving the intercepted request from the hook, the interface unit may associate a connection identifier with the established communication link. The interface unit may then send a notification to the hook that indicates the communication link with the node has been established. This notification may also include the connection identifier. After receiving the notification from the interface unit, the agent may notify the application that a connection has been established with the node. Subsequently, the agent may intercept a subsequent communication from the application of the client directed at the node before the subsequent communication can be received by the transport layer of the client. The agent may then send the subsequent communication with the connection identifier to the interface unit through the established network connection over the public network. After receipt of the subsequent communication with the connection identifier from the hook, the interface unit may use the connection identifier to identify the associated communication link and then forward the subsequent communication to the node via the associated communication link.

In one embodiment, a determination may be made as to whether the pre-established network connection has been established with the interface unit prior to sending of the request or command to the interface unit. If the pre-established network connection has not been established with the interface unit, then a network connection may then be established with the interface unit prior to sending of the request or command to the interface unit.

In one implementation, the request and/or the communication from the application of the client may comprise a Transmission Control Protocol (TCP) operation directed to the transport layer of the client. In another implementation, the pre-established network connection may comprises a TCP tunnel (e.g., a TCP socket) established over the public network. In yet another implementation, the pre-established network connection may be encrypted, (e.g., communications over the pre-established network connection are encrypted). In such an implementation, the pre-established network connection may be encrypted utilizing a secured sockets layer encryption protocol (SSL). In a further implementation, the communication link between the interface unit and the node over the private network may comprise a Transmission Control Protocol/Internet Protocol (TCP/IP) connection.

In one embodiment, the request, the communication, and/or the termination request from the application may be transmitted over the pre-established network connection encapsulated a single packet. In such an embodiment, the connection identifier may be included in the packet. In another embodiment, the application may be monitored for the issuance of TCP operations to the network layer of the client. In a further embodiment, a network connection over the public network may be established with one or more an additional interface units coupled to the same or different private networks. In one embodiment, communications from the application that are not directed to the node may be permitted to be received by the network layer of the client.

In one embodiment, the connection identifier may be generated using information based on at least one of a network address of the node. In another implementation, the connection identifier may be generated by the interface unit from a four tuple of a private side IP address and port of the interface unit and an IP address and port of the node. In yet another implementation, the request from the application may be identified for interception by one or more of a source port, a source IP address, a destination port, and a destination IP address.

DETAILED DESCRIPTION

Figure 1:
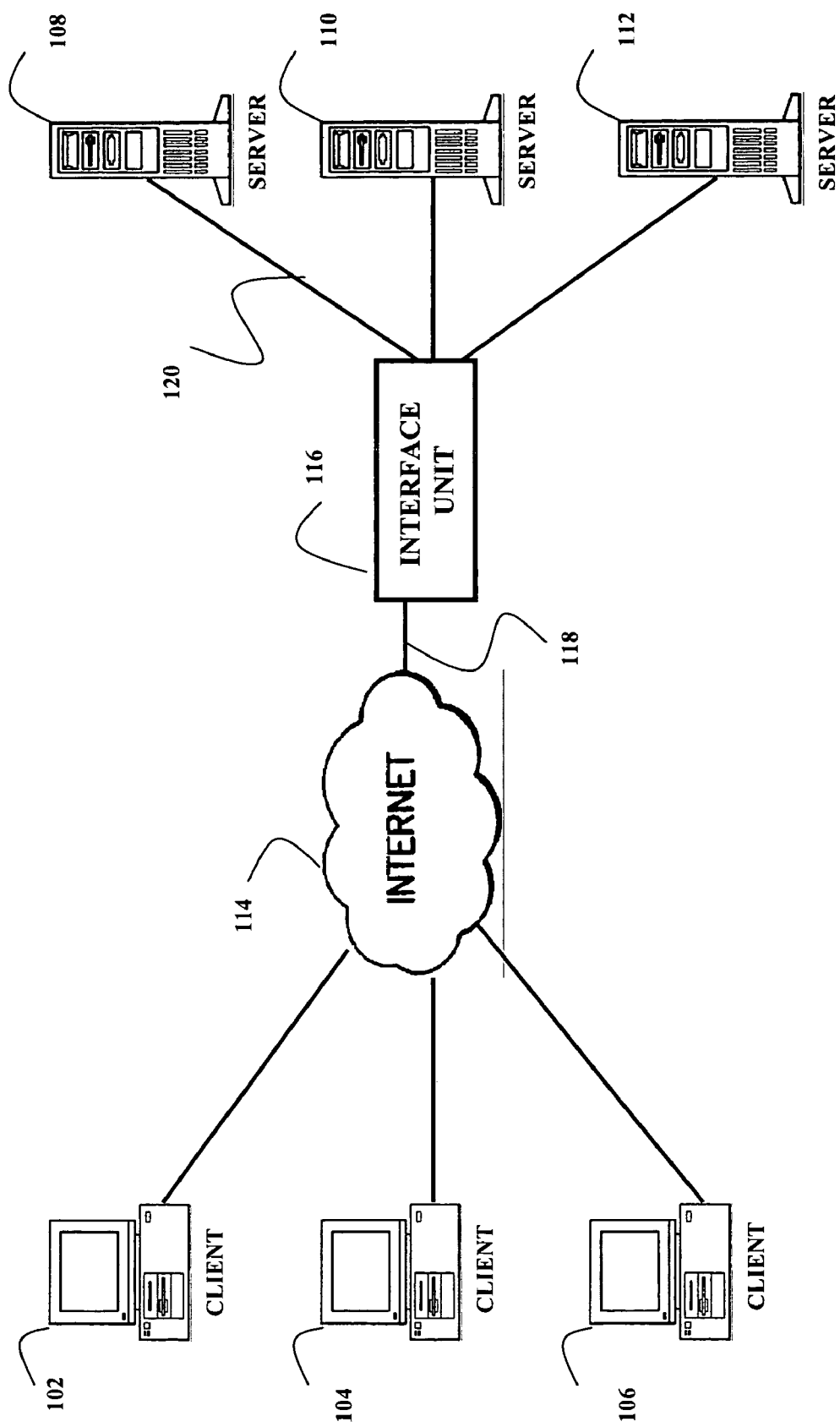
FIG. 1 is a network context block diagram for plurality of clients connected to a private network server using an interface unit in accordance with an embodiment.

Tunneling is a methodology that is commonly used for accessing private network resources from the remote location, which may be referred as to as a remote client. Remote clients may access private network resources via a tunnel between the remote client and an interface unit of the private network. The interface unit may act as a tunneling gateway for remote network access. The tunnels may be based on reliable protocol such as TCP. While shipping TCP packets, (which may be a reliable protocol by itself), there may be a redundancy of reliable protocol getting shipped over another reliable protocol. This redundancy may cause latency and may also cause catastrophic results in congested networks because packets lost in the outer tunnel may aggravate the loss of packets in the tunneled connection and, as a result, the packet loss may increase in exponentially. In such cases, performance may be increased by transferring only relevant TCP control packets to thereby packets, thereby eliminating the latency. The performance improvements described herein may be implemented in any proprietary protocol and on any platform to reduce the latency involved in transferring the excess TCP information.

Embodiments of the present invention may provide systems and methods for increasing the performance of computer networks, whenever one wishes to access a private network over a reliable tunnel. When remote client wants to open a connection to the private network machine, the TCP operation request (which is connection open—e.g., SYN in this case) may be intercepted by the relay agent on the remote client and then may be forwarded to the interface unit via tunnel established between the remote client and the interface unit.

The interface unit may retrieve the TCP operational information between remote clients to private network resource and then relay this information (in form of a TCP packet) to the private network. In such a case, the interface unit may open a TCP connection to the private network server on behalf of the remote machine. The response from the private network server may be replied back to the client (e.g. connect success or connection refused).

Similarly, when the remote client sends the TCP data (via write system call from the application), the relay agent intercepts this call, and instead of sending it to TCP to perform TCP segmentation on the call, the relay agent encapsulates this data in a control header and it is then written over the TCP tunnel. Thus, in this case, the application data for the private network is not segmented into TCP packets and then sent over TCP tunnel (which will cause TCP over TCP problems, as previously discussed). Instead, the entire TCP data is sent over the tunnel, unsegmented, encapsulated in the control header. The reliability of this data transfer may be taken care by the tunneling protocol beneath. Thus, one may avoid additional TCP acknowledgement packets.

A performance improvement and reduction in latency may thus be achieved by proxying the TCP connections from remote client to private network resource by a relay agent on the remote client. This agent residing at remote client transfers only the TCP commands to the interface unit over the TCP tunnel between remote client and interface unit. Thus, the interface unit interprets the TCP command and proxy the command using its own TCP stack. Accordingly, a TCP connection between the remote system and the private network resource is not established directly but, rather, it is opened between the interface unit and the private network resource. This approach may help to reduce the delay in transmitting of the TCP's control packets over the TCP connection created between the remote client and the interface unit and, consequently, saving the round trip time between computer network components. Such an approach may also help to reduce the amount of data flowing from the remote client to interface unit over public network and thereby help reduce bandwidth consumption.

FIG. 1 shows a network context diagram for the interface unit 116 according to one embodiment. In this embodiment, an interface unit may comprise an intelligent network interface card with a CPU inside a server. An interface unit may also comprise an intelligent box sitting outside the server, in which case the interface unit may serve more than one server. The interface unit 116 may also be a load balancer, bandwidth manager, firewall, router, switch, computer system, or any other network device that may be located between a client and server.

With continued reference to FIG. 1, a plurality of clients 102, 104, 106 may be connected to the interface unit 116 through the Internet 114. A plurality of server 108, 110, 112 may be connected to the interface unit 116. In this implementation, clients may only connect to the servers via an interface unit. The network link 120 may comprise a private network and may not be connected through outside world without the interface unit 116. The network link 118 may comprise a public network link, which can be communicated by any client connected to the Internet. In one implementation, the network resource of private network server may be accessed by the remote clients connected to the interface unit using Internet.

To transfer the data from public network to private network community have started using the Secure Socket Layer (SSL) tunnel for extended security, application control, reliability and ease of management. SSL protocol works over TCP/IP to transmit any application data that also uses TCP/IP as network protocol. In one embodiment, the control packets and data packets of the application data may be treated as the application packet of the SSL session between the client and the interface unit. As a SSL tunnel is already reliable, one may simply transmit the application packet to the other end of the tunnel where the interface unit may then intelligently use this application packet and make a TCP network connection to the server.

Figure 2:
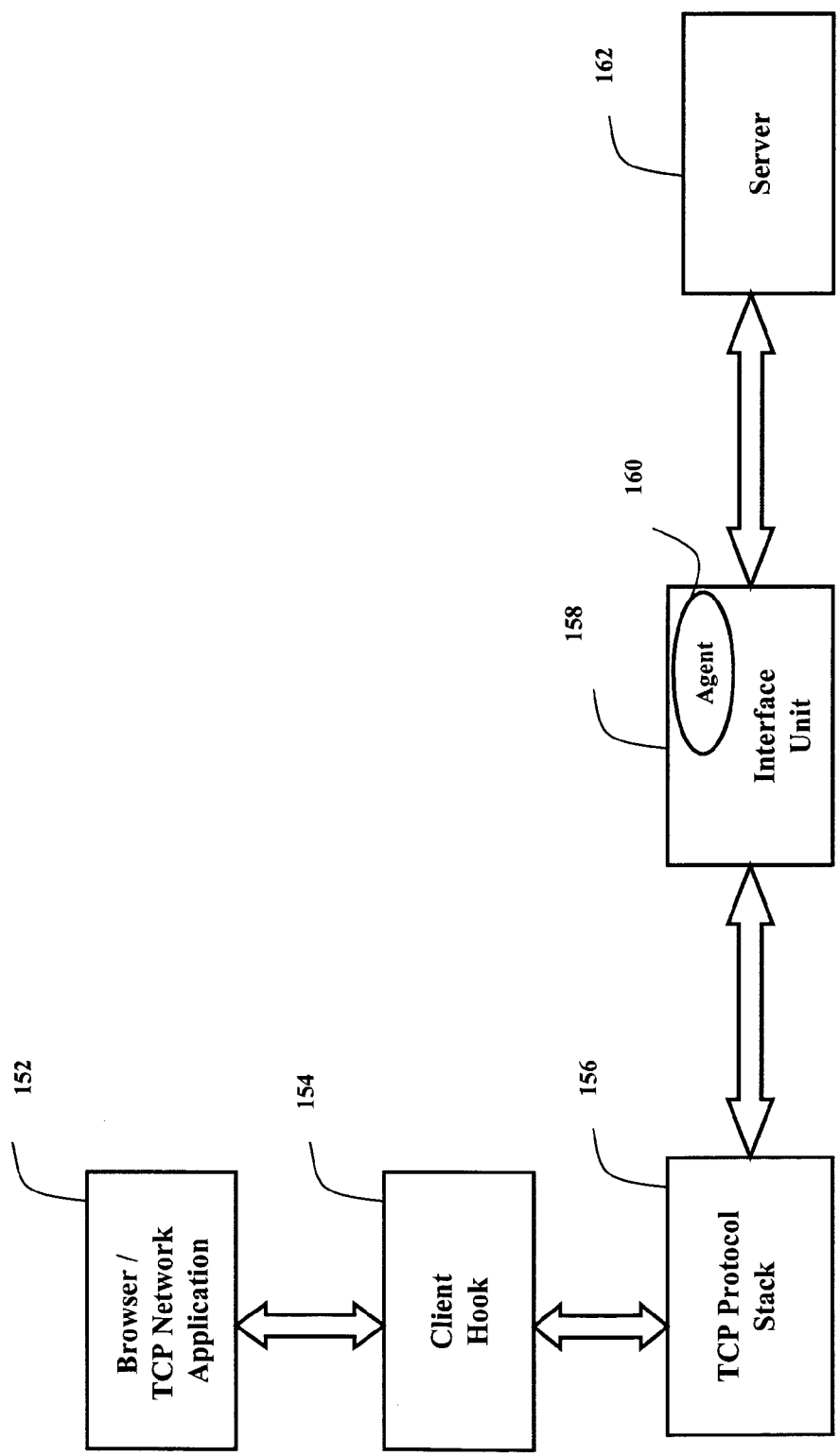
FIG. 2 is a block diagram of a client connected to a private network server through an interface unit using an agent and a client hook at the client side in accordance with an embodiment.

FIG. 2 is a block diagram of the various components in the current invention. A client system is connected to the private network server using an interface unit at the server's end. A browser/TCP network application 152 communicates to the Server 162 using the interface unit 158 via a network protocol (e.g., TCP/IP) stack 156. Client hook 154 is a client side component that may intercept the entire request to access the TCP network resource of the private network from the clients TCP network application. This component may establish a TCP connection between the agent 160 residing at the interface unit 158. This TCP connection may be made further secure using Secure Socket Layer (SSL). This SSL connection may then form the tunnel to transfer the data between client and server.

The client hook 154 may intercept the entire TCP call issued by the application 152 before the TCP protocol stack 156 so that the TCP protocol stack does not handle the TCP connection to private network server. In order to intercept the call, the client hook recognizes the TCP call and then transforms it into the data over the SSL tunnel that has already been established between client and interface unit.

An agent 160 on the interface unit 158 may by provided to receive the client calls from the SSL tunnel, understand the meaning of the call, and then execute that on private network side. The agent 160 may then perform the remote procedure calls on behalf of client with the server. In this manner, connections that need to be opened by the client to server may be opened instead by the interface unit to server and the entire data flow may be managed by the agent with respect to clients calls tunneled in the SSL tunnel.

Figure 3A:
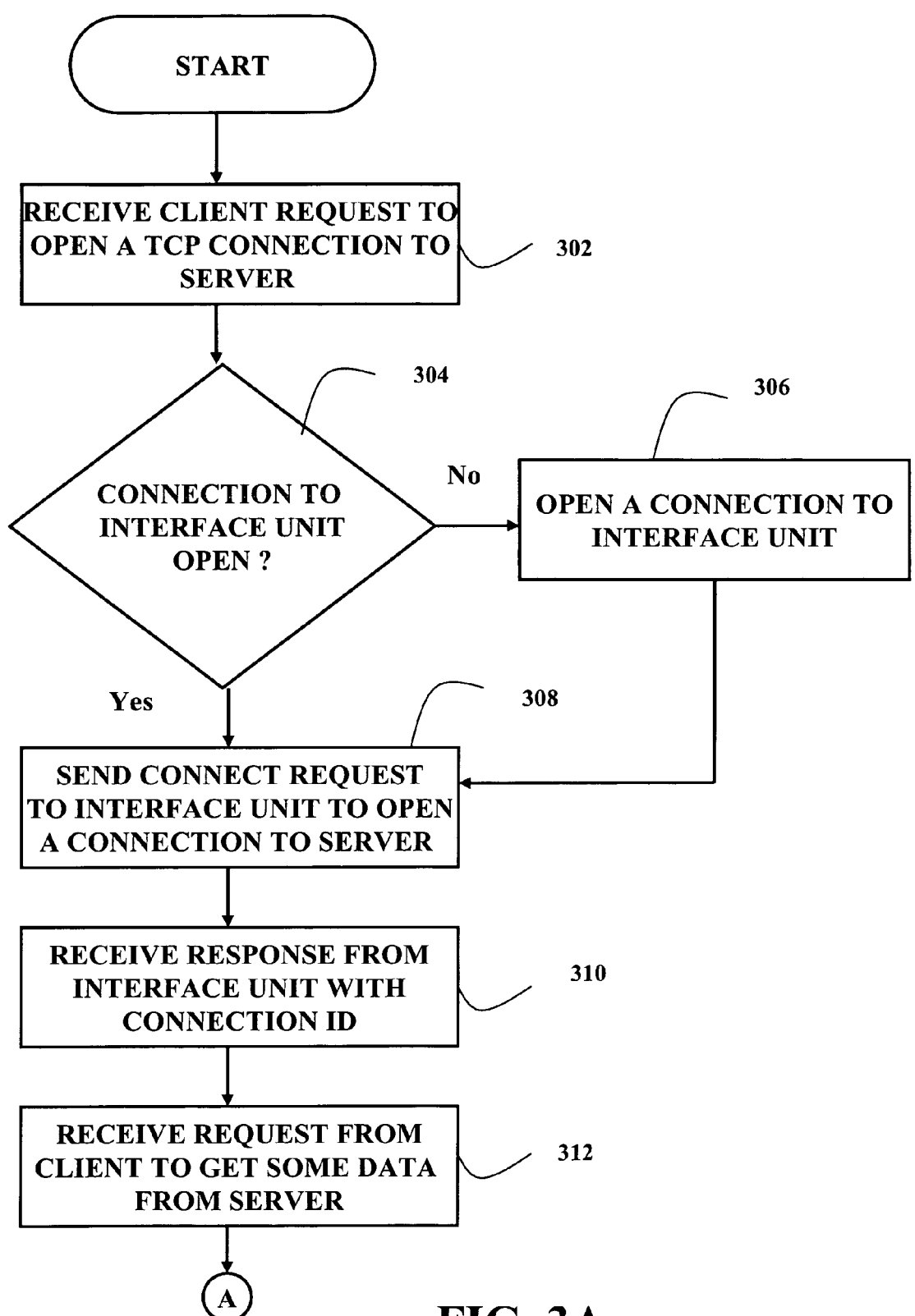
FIGS. 3A and 3B show a flowchart of a process at the client end to tunnel a private network TCP connection over a TCP session with an interface unit in accordance with an embodiment.
Figure 3B:
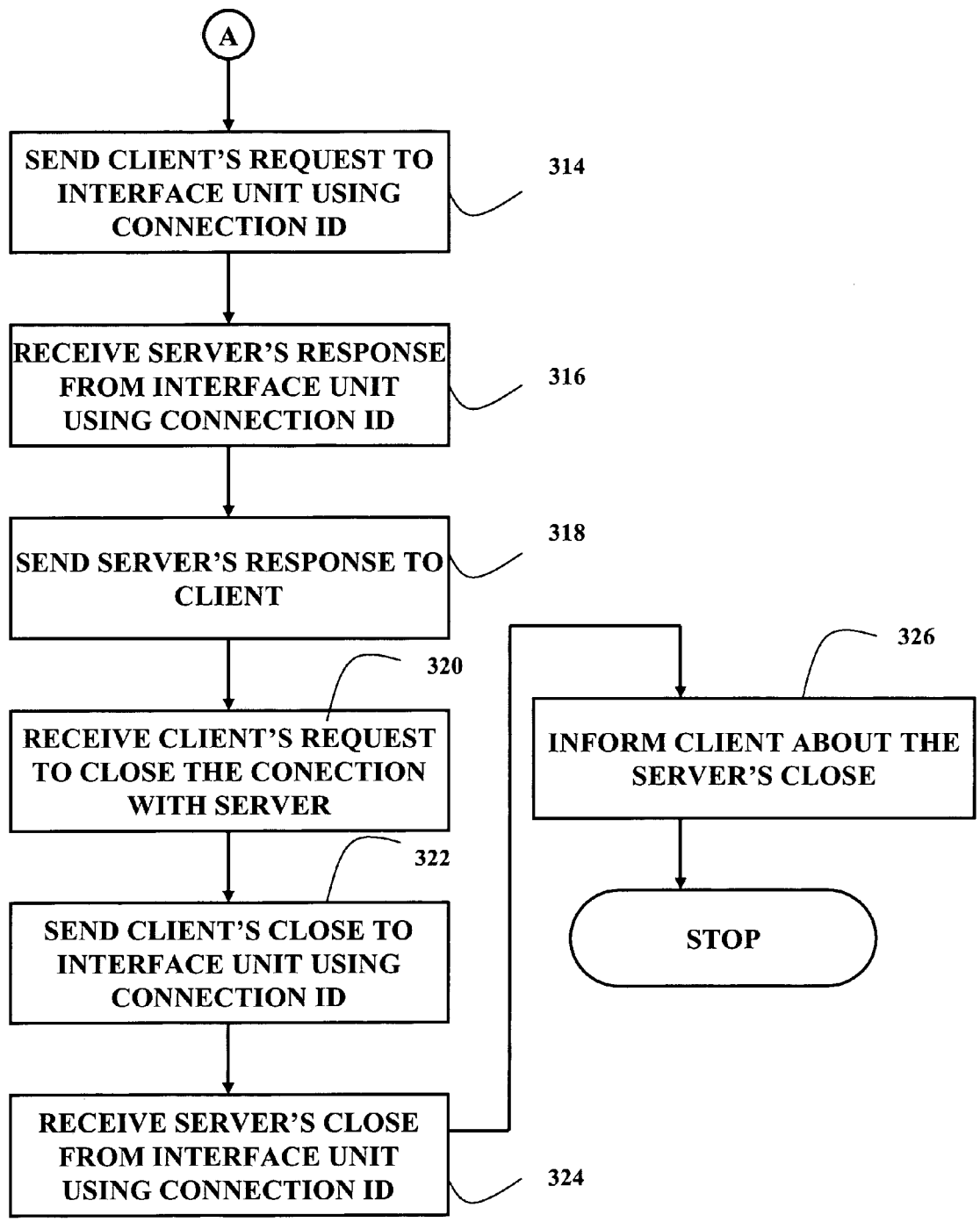

FIGS. 3A and 3B illustrate a flowchart of a process which explains an implementation from the client side. This process may be executed by the client hook 154 on FIG. 2. In general, a TCP sessions starts by the opening of a TCP connection to the server. In order to do so, the client issues a requests directed to the TCP/IP protocol stack to open a TCP connection with the server. This connection request is intercepted by the client hook in operation 302. At operation 302, the client hook may intercept all of the TCP calls to client's TCP network protocol stack so that it can receive the request from application to open a connection to the private network server. At operation 304, the client hook may check and see whether it has already opened TCP-SSL connection with interface unit through which the data intended for the private network may be tunneled. If the connection is not present, then at operation 306 the client hook may open a TCP network connection between client and interface unit. At operation 308, the client hooks may form a connect request packet based on the application's request to open a TCP connection to the server at the private network and this connection request packet is then transmitted to the private network using the SSL tunnel created by the client hook. At operation 310, the client hook may receive the result of the connection request to the private network server. If a connection is successfully opened, then in operation 310, the client hook receives the successful connection open to server result from the interface unit with a unique connection ID by which this connection can be identified by the interface unit (since the new connection does not have a peer end between client and server). This connection ID may be used by the client hook to send any information to the server and receive any information from the server. In one embodiment, one may avoid the generation of connection ID if one pairs the client's connection to the server with every connection between the client to the interface unit.

At operation 312, the client hook may receive a request from the application to get some data from server. Alternatively, the request may be for any application data write on the TCP connection with the server. At operation 314, the client hook may form the corresponding write request to server from client using the connection ID from the interface unit's connect response (that was received in operation 310). At operation 316, the client hook may receive the data from server using the connection ID. The client hook may then identify the client connection and subsequently inform the application which is waiting for the data from the server at operation 318. This operation may be repeated until one of the entities decides to close the TCP connection.

Closing of connection may be handled in a similar fashion as the opening of connection. At operation 320, the client hook may receive a request to close the connection. The request to close the connection is encapsulated with the connection ID and transmitted over the SSL tunnel to the interface unit at the operation 322. The client hook may then subsequently receive a connection close request from the server at operation 324. In response, the client hook may then find the appropriate application and client connection at operation 326 and inform the client about the connection close from the server. All other TCP calls for this connection may also be proxied to the server using the SSL tunnel.

Figure 4A:
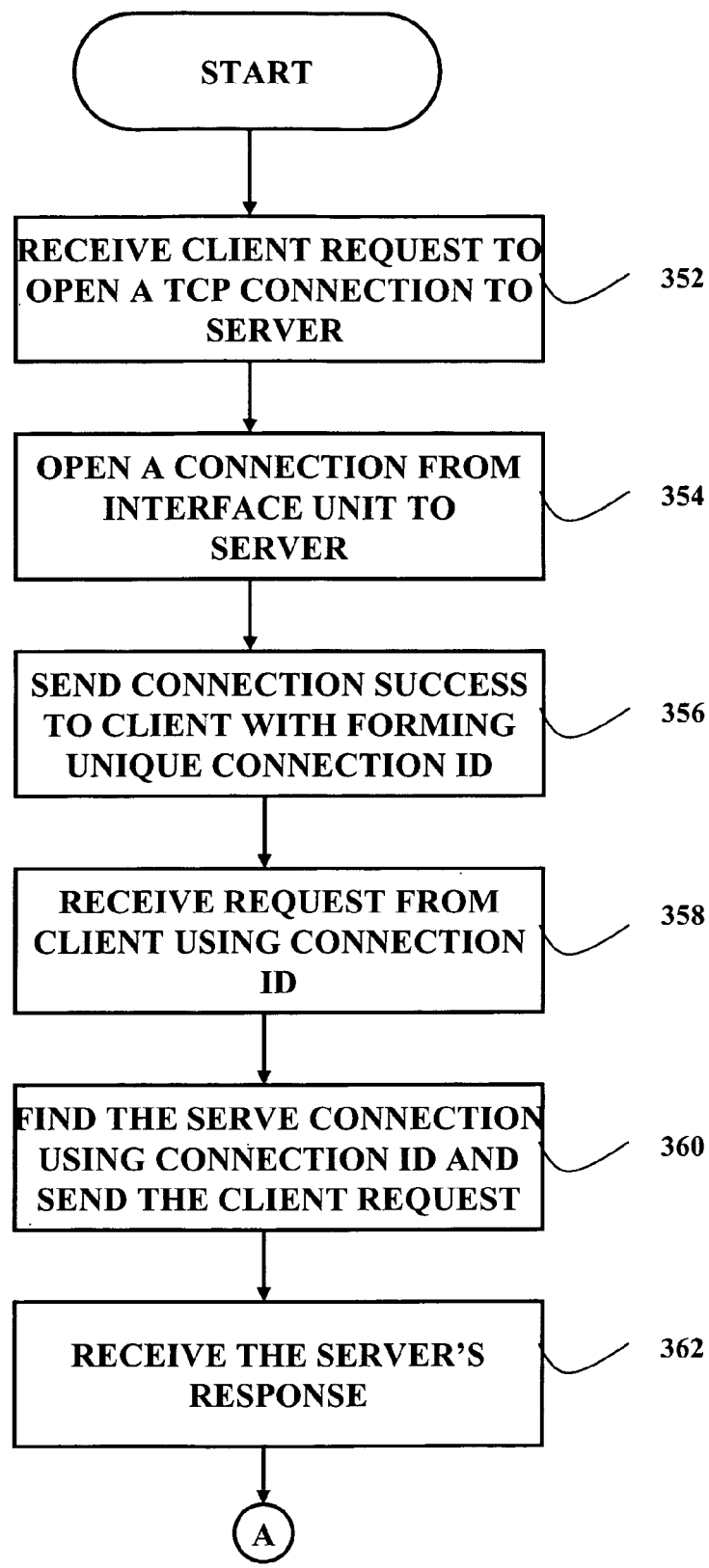
FIGS. 4A and 4B show a flowchart of a process at an interface unit which receives a network connection for a private network server from a client in accordance with an embodiment.
Figure 4B:
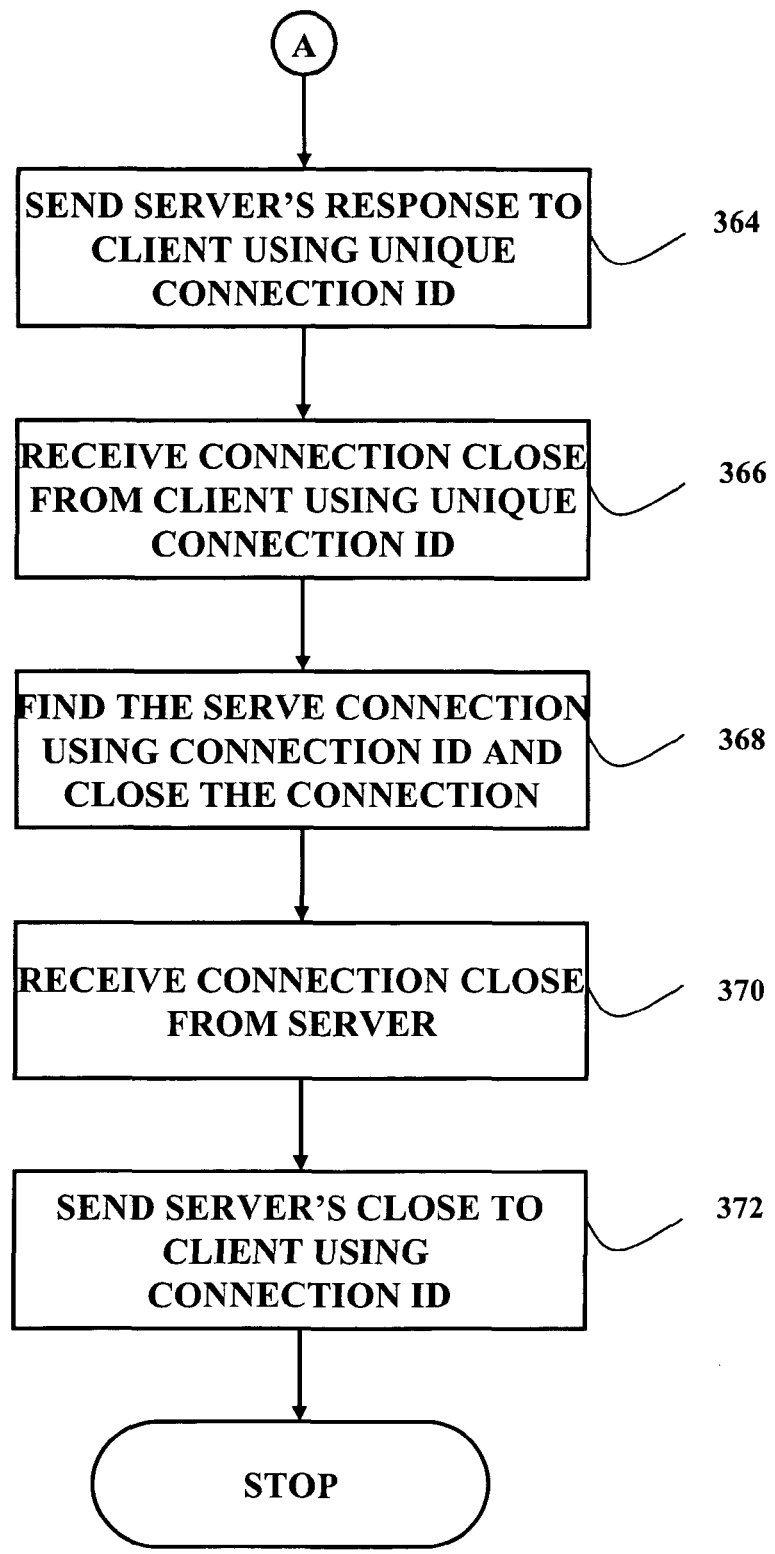

FIGS. 4A and 4B is a flowchart, which explains an embodiment of the process from the interface unit's side. This procedure may be executed by the interface unit 158 and its agent 160 shown in FIG. 2. The interface unit may receive a client's request to open a TCP connection to a private network server 162 as set forth in operation 352. Agent 160 may then open a connection to the private network machine 162 in operation 354. Once the interface unit/agent receives a connection response from the private network machine, the interface unit/agent may send the response with unique connection ID in operation 356. The client side may henceforth use this connection ID to correspond with the interface unit associated with this connection. When the client side sends a request (data transfer), the request may be sent using the connection ID. In operation 360, the interface unit receives this request, locates the private side connection using the connection ID, and then relays the client request (data transfer) on that connection. After the interface unit receives response from the server in operation 362, the interface unit may send the response to the client side using the same connection ID in operation 364. Once data transfers are complete, the interface unit may receive the connection close call from the client side at operation 366. In operation 368, the interface unit may then locate the private network side's connection using the connection ID and close the connection. Once the connection is closed from the server as well (see operation 370), the interface unit may send the server's close response to the client in operation 372.

Figure 5A:
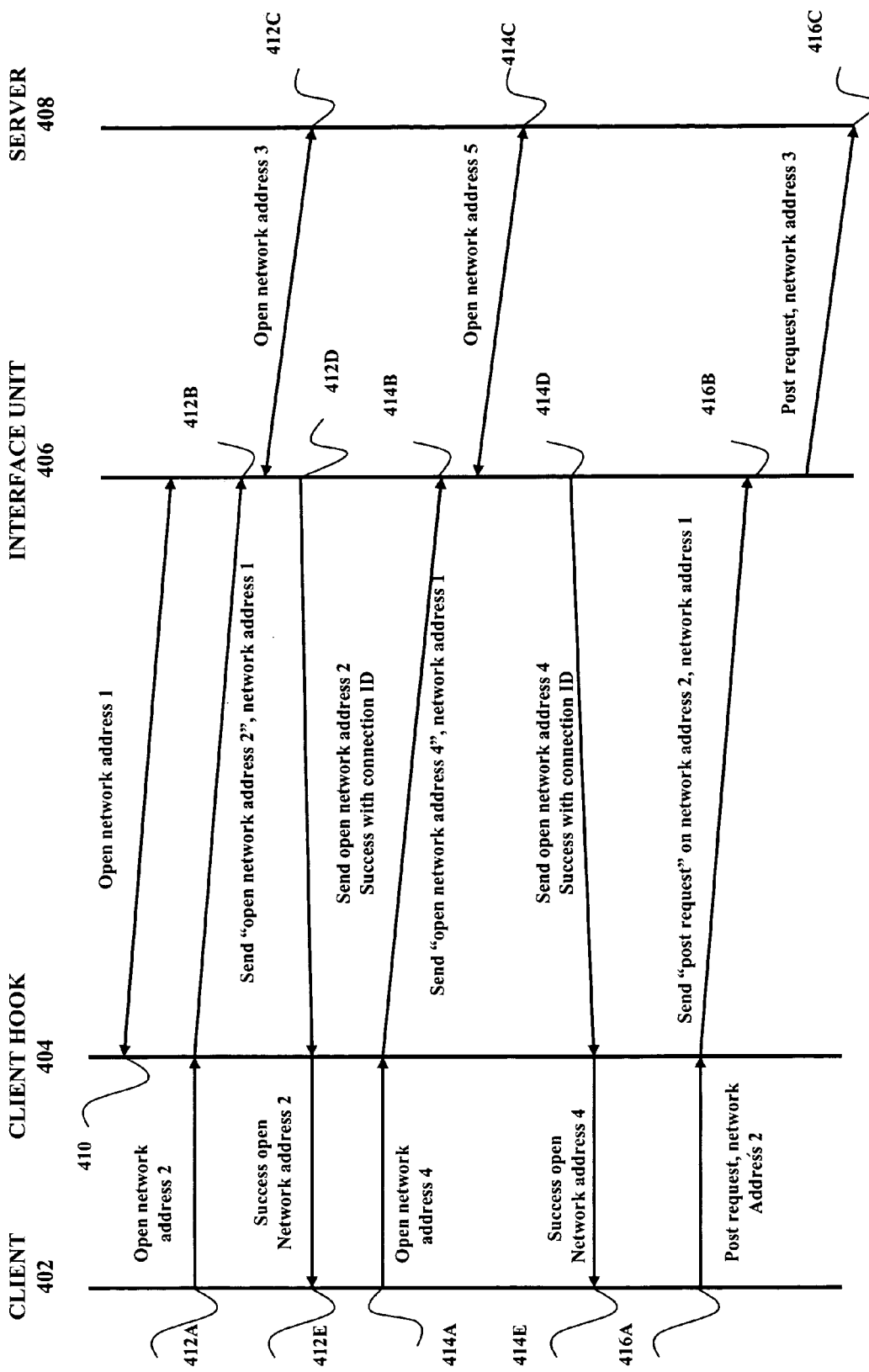
FIGS. 5A and 5B shows message flow diagram illustrating a TCP connection proxy by a client hook using an interface unit to reach a private network server from a client in accordance with an embodiment.
Figure 5B:
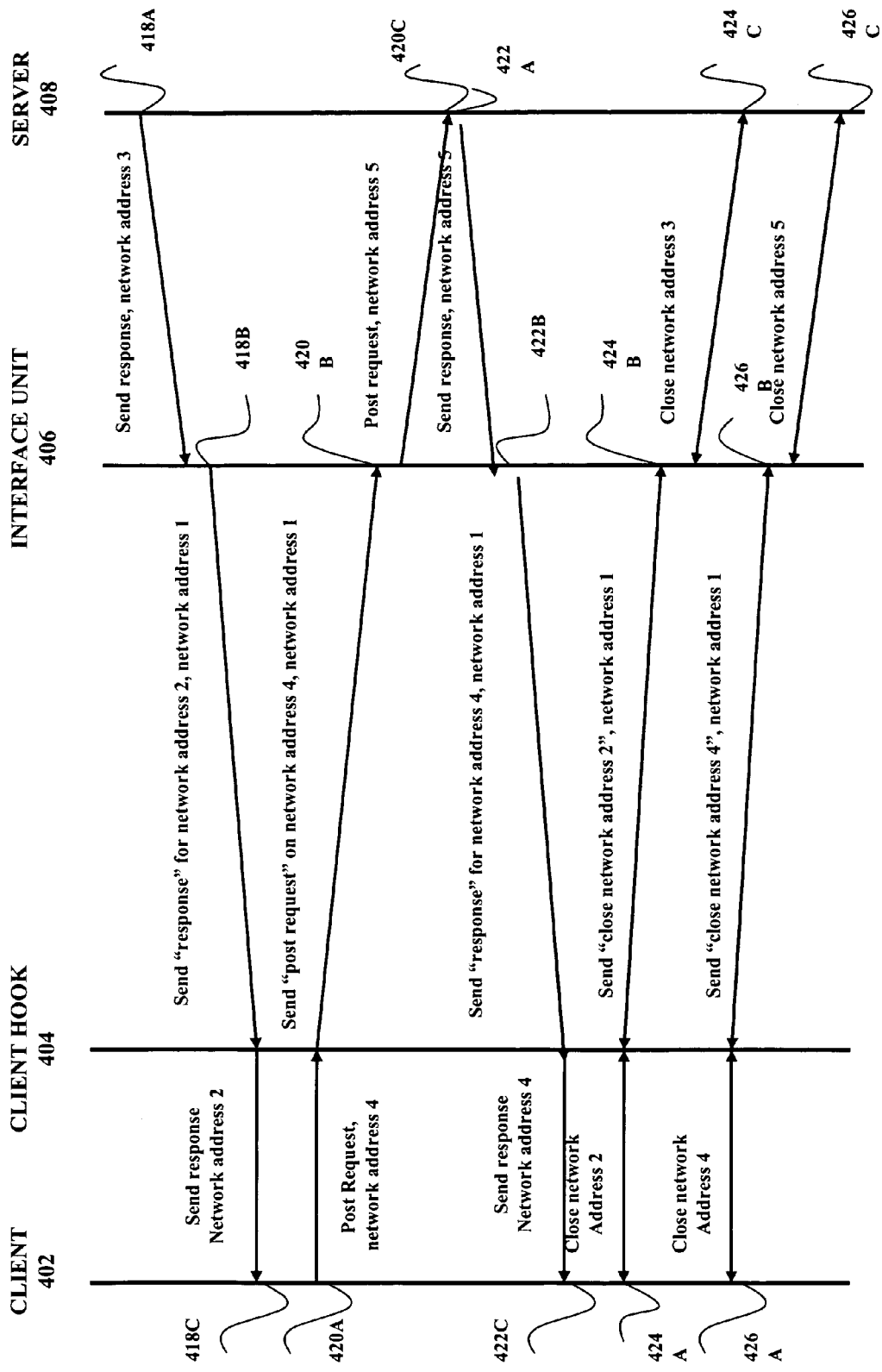

FIGS. 5A and 5B explain an implementation of the network connection operations from a remote client 402 to a client hook 404, then to an interface unit 406, and then to a private network machine 408. The client hook, when initiated, may establish a network connection 410 with interface unit. The network connection 410 acts as a tunnel connection for the client 402 to reach the private network server 408. The client 402 may open a network connection to the private network machine 408 as 412A; which is intercepted by client hook 404 and then transferred as 412B to the interface unit 406 over network connection 410. The interface unit 406 may then open a connection 412C to the server 408. The interface unit may then replies with flow 412D which comprises the connection response and with the connection ID (that should be used by client for future communication over same connection). Once client hook agent 404 receives the connect success response from the interface unit, the client hook agent may relay that response to the client 402 via flow 412E. The client is thereby connected to the private network server via client hook 404 and interface unit 406. Client may also open a similar connection 414 similar to 412, which may be intercepted and handled in a corresponding manner by the client hook 404 and the interface unit 406.

When a client sends a data post request (e.g., data post request 416A) that is directed to the server 408, the request 416A is intercepted by the client hook 404 which sent the request to the interface unit 406 using the connection ID as shown in flow 416B. The client's request may then be forwarded to the interface unit by the client hook using the connection ID as shown in flow 416C. Once the server responds back with the data (as shown in flow 418A); the response is forwarded to the client hook as flow 418B; which in turn sends the data to the client via flow 418C. A similar data transfer over is shown in the flow 420 A, B and C, and 422 A, B and C.

When client issues a close command over network address 2 (represented by close command 424A), the command is forwarded by the client hook to the interface unit via network connection 410 as shown in the flow 424B. The interface unit then closes the server side connection as shown in the flow 424C. The closing of the connection (i.e., "connection close") for network address 4 is depicted by flows 426A, 426B and 426C.

Figure 6A:
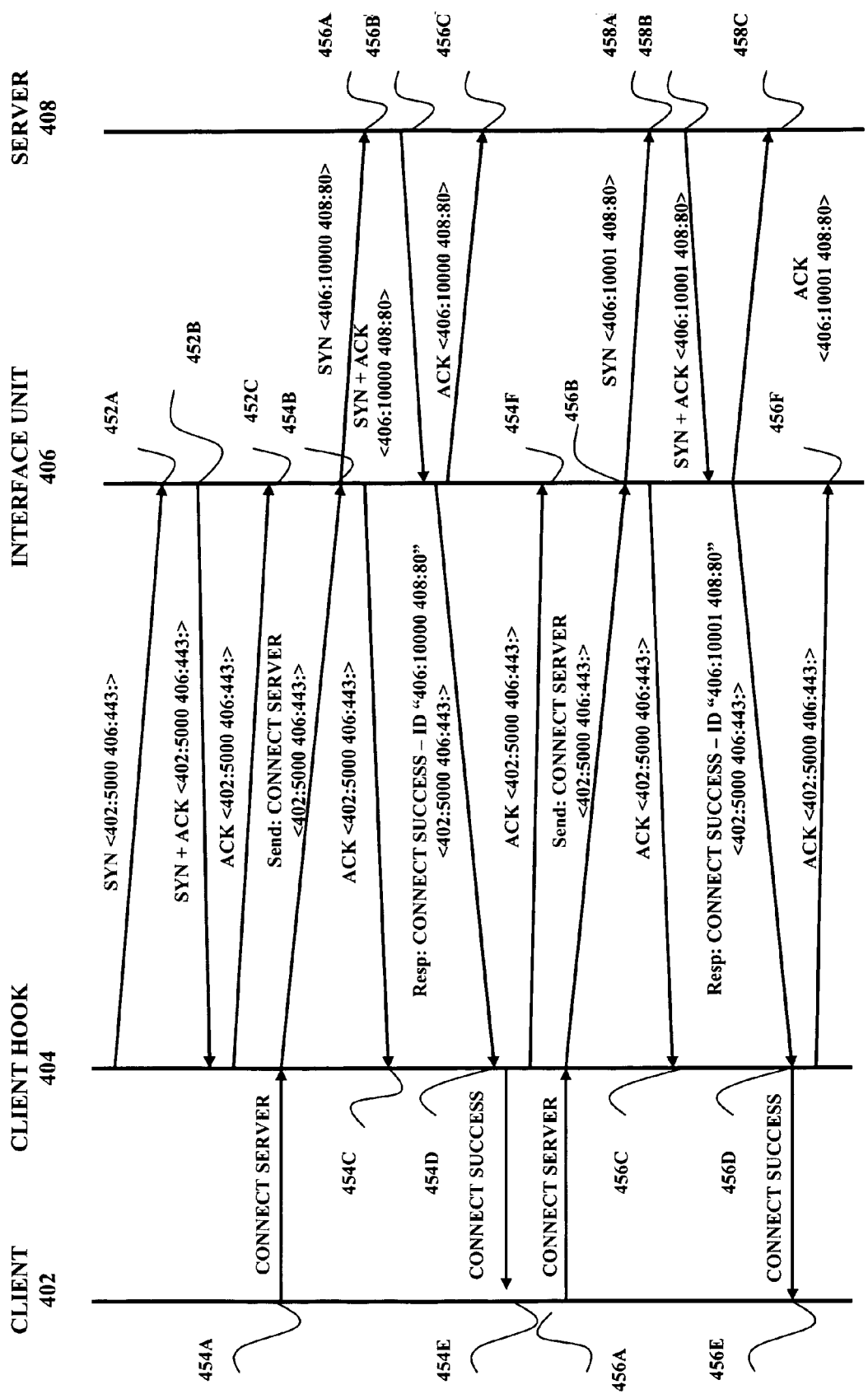
FIGS. 6A and 6B show a detailed flow diagram illustration with TCP packets to illustrate how a TCP connection travels over a tunnel TCP session between a client hook and an interface unit performed by the implementation set forth in FIGS. 5A and 5B in accordance with an embodiment.
Figure 6B:
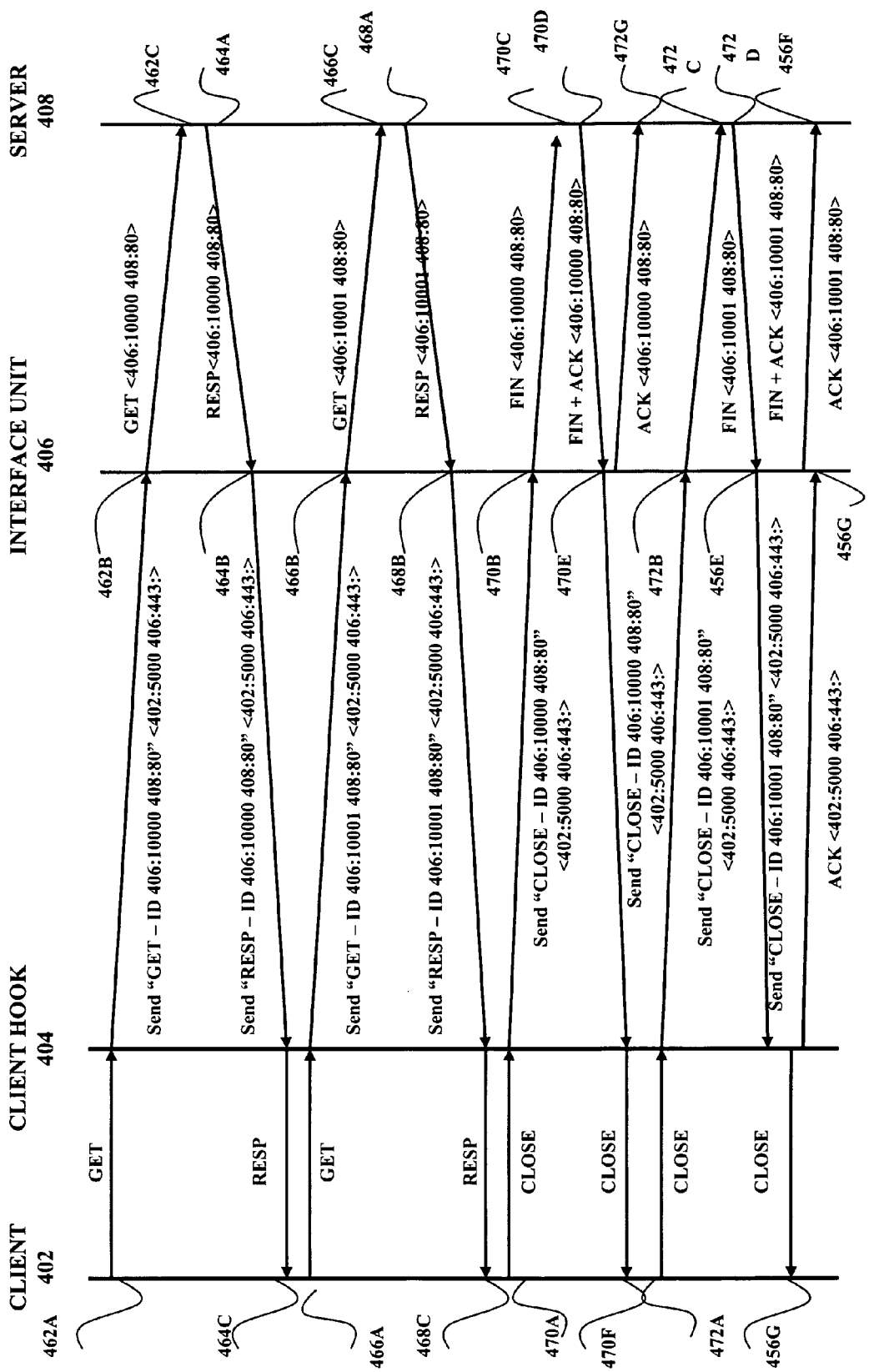

FIGS. 6A and 6B explain an exemplary TCP packet flow from a remote client 402 to a client hook 404, to interface unit 406, and then to a private network machine 408 in accordance with the implementation set forth in FIGS. 5A and 5B. The network address connection 410 is shown with a three-way handshake of TCP as flow 452A, 452B and 452C. The open network connection request from client 402 is shown as flow 454A, which is forwarded by the client hook agent to the interface unit as flow 454B. The interface unit then establishes a connection from its port "10000" to server 408 on port "80" using the TCP three-way handshake 456A, 456B, and 456C. The response of a successful connection opening to server 408 on port 80 is shown in flow 454D which contains the connection ID "406:10000 408:80", which is a four tuple of the connection between interface unit 406 and the server 408. This four tuple can uniquely identify the proxied connection for any client. The client hook agent 404 may then relay the response to the client as 454E thereby establishing the client connection with server 408 on port 80. The client may establish a similar connection 456 which would have its unique connection ID as "406:10001 408:80."

When client sends the data to the server, it is shown as flow 462A. The client hook sends the data to the interface unit using the connection ID <406:10000 408:80> as shown in flow 462B over the tunnel connection established by the client hook with interface unit <402:5000 406:443>. The interface unit 404 then interprets and forwards the data 462B to the server as flow 462C. Once the interface unit receives a response from server as flow 464A, the interface unit forwards the response over the tunnel network connection back to the client hook as flow 464B. The client hook then relays the response to the client as flow 464C. A similar data request 466 for a different connection (Identified by the connection ID <406:10001 408:80>) between client and server may be shipped over the same network connection between client hook agent and the interface unit using a different connection ID—in this case, <406:10001 408:80>—as shown in flow 466B.

Next, when the client sends a close request as flow 470A, the client hook forwards the same to interface unit as flow 470B which is includes CLOSE request for connection ID <406:10000 408:80>. The interface unit then sends the FIN packet 470C on the server side connection. Once the server sends a Close response as FIN+ACK, 470C, the interface unit replies to the client hook that the same connection is closed. Flow 472 shows the closing of the connection (i.e., "connection close") on the second TCP network connection from client 402 to server 408. As previously mentioned, different client applications may open connections with multiple servers on the private network of the interface unit 406 on various ports.

Figure 7:
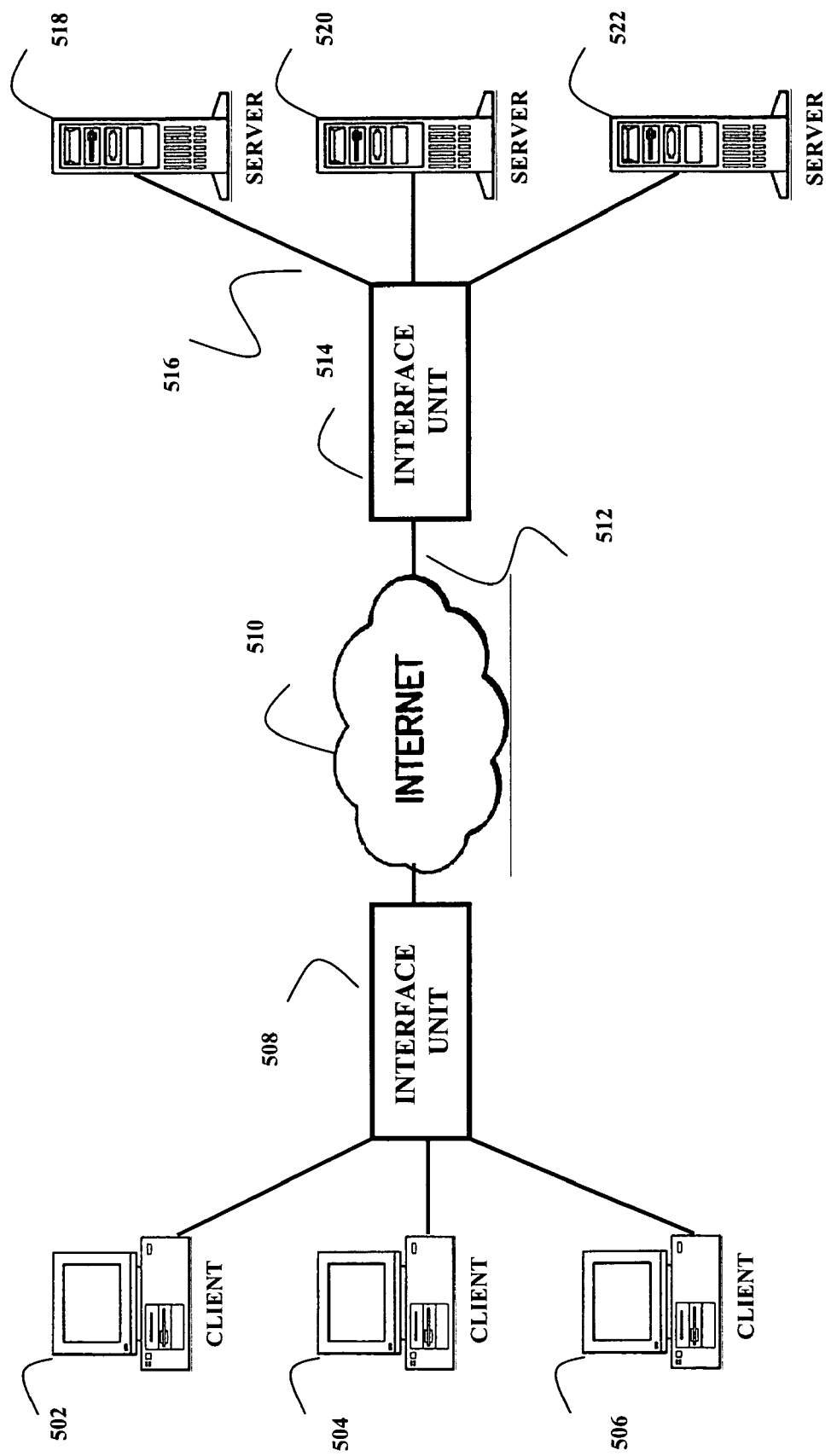
FIG. 7 shows a network context diagram where plurality of clients are connected to a private network server using an interface unit at the clients' end and an interface unit at the private network's side in accordance with an embodiment.

FIG. 7 shows an network context diagram where multiple clients 502, 504, 506 are connected to the Internet 510 using the interface unit 508 in accordance with one embodiment. In embodiment, multiple clients 502, 504, 506 may be connected to the private network interface unit 514 using a single interface unit 508. Similarly, multiple servers 518, 520, 522 may be connected to the interface unit 514 on the private network 516. A server side interface unit 514 may act as an interface to connect the public network 512 and the private network 516.

Figure 8:
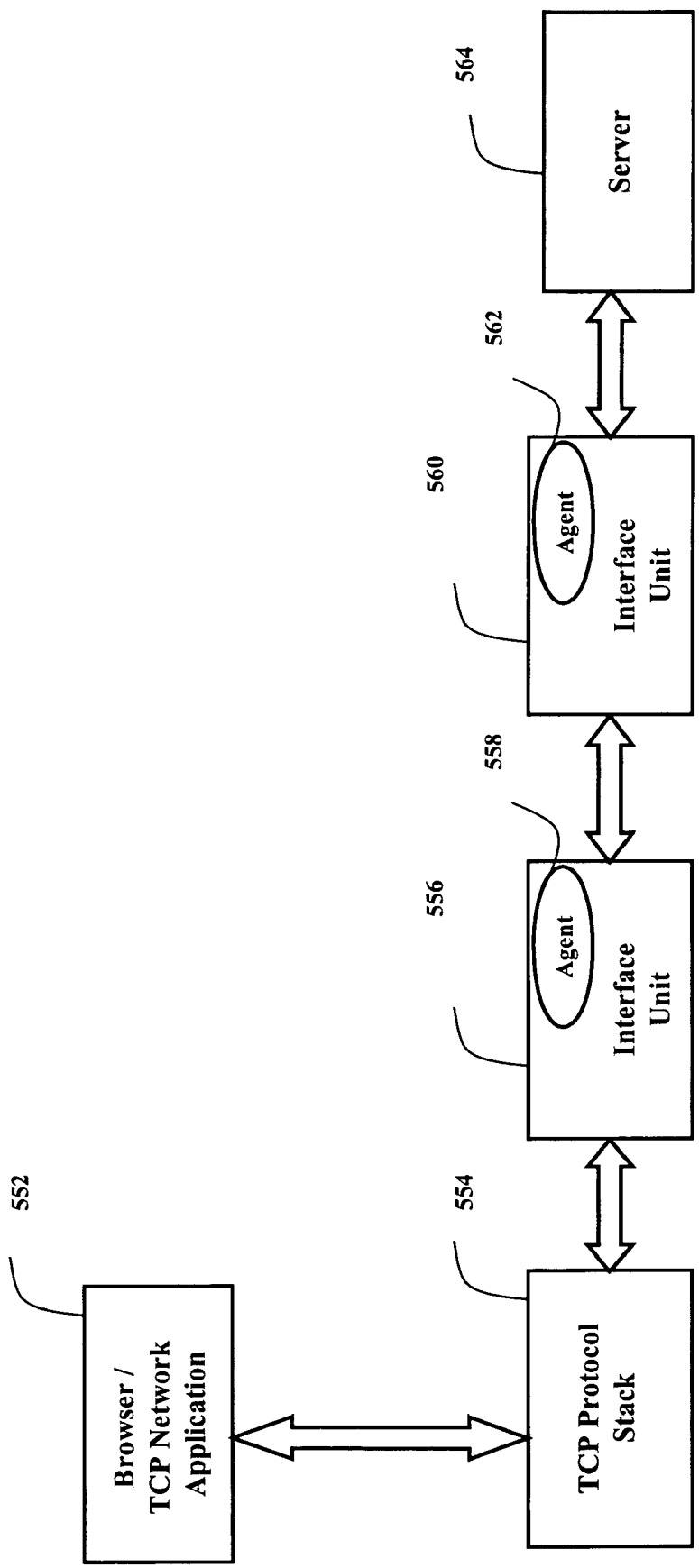
FIG. 8 shows a block diagram of the network context diagram described in FIG. 7, where the TCP tunneling of client's connection may be performed between the two interface units in accordance with an embodiment.

FIG. 8 shows the block diagram depicting a scenario under the embodiment set forth in FIG. 7. As shown, a Browser/TCP Network Application 552 and a TCP protocol stack 554 form the client system. This client system is connected to the interface unit 556 which has agent 558. A similar interface unit 560, which has agent 562, is at the server's end and connects the server 564. In this setup, a TCP connection opened by client application 552 passes the client's TCP protocol stack 554 and reaches the interface unit 556. This interface unit 556 accepts the TCP request for the private network and its agent 558 establishes the TCP session with interface unit 560 at the server's end. All of the TCP network resources served by the server 564 may travel over the TCP session established between the interface unit 556 and 560. The agent 558 in at the interface unit 556 may act in a similar fashion as the client hook 154 described in the embodiment depicted FIG. 2.

Figure 9A:
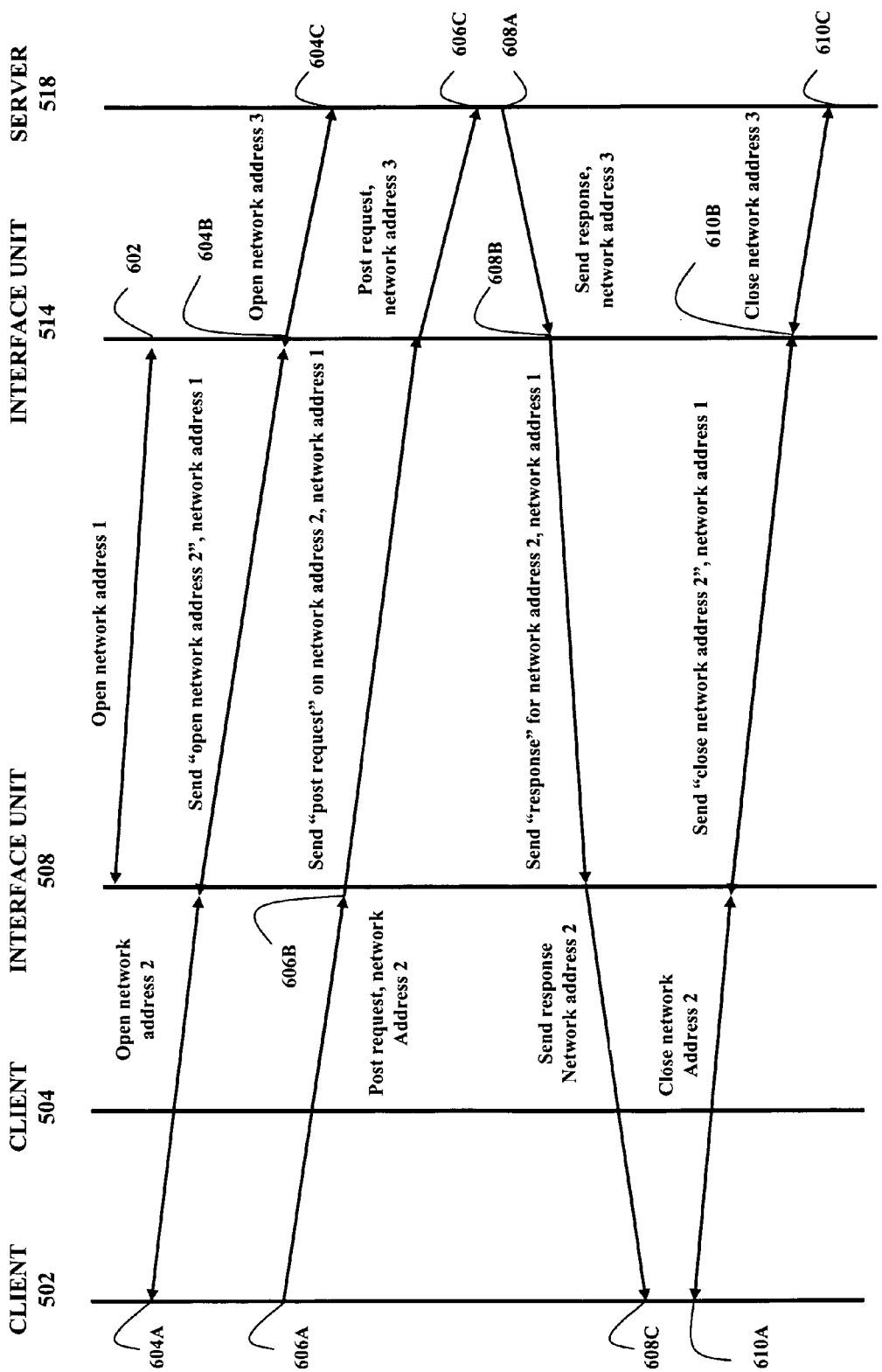
FIGS. 9A and 9B shows a message flow diagram where plurality of clients tunnel their TCP connections for a private network system using interface units present at both the network in accordance with an embodiment.
Figure 9B:
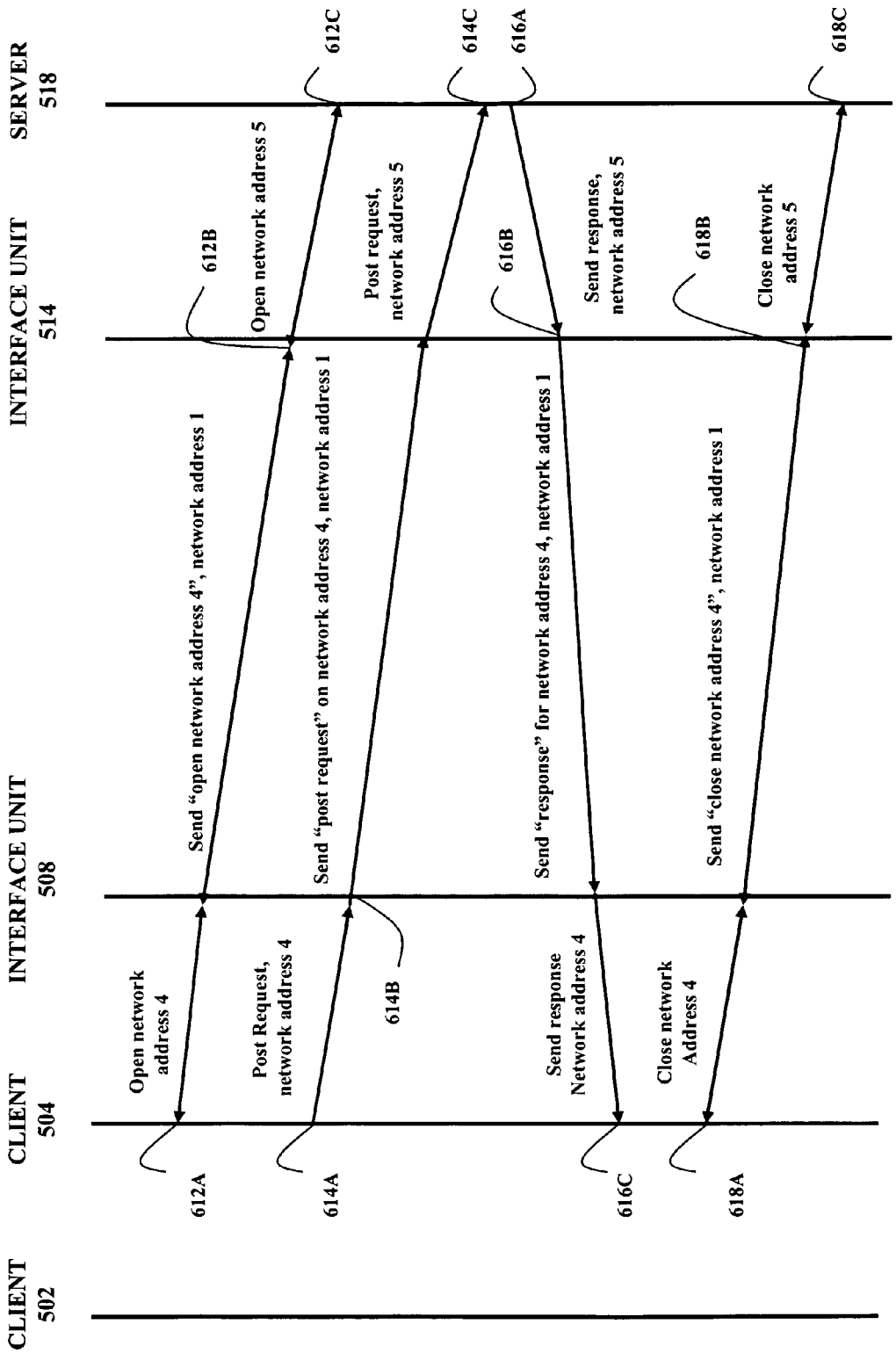

FIGS. 9A and 9B are a message flow diagram for multiple clients connected to a single interface unit provided at the client's end as set forth in the embodiment depicted in FIG. 7. Returning to FIG. 7, there is shown an interface unit 508 connecting two clients 502 and 504 to another interface unit 514 in the public network. FIG. 7 shows interface unit 514 connecting to server 518 in the private network, thus enabling the two clients 502 and 505 access the network resource (e.g. TCP) of server 518 using the interface unit 508 and 514.

Returning to FIGS. 9A and 9B, the interface unit 508 first opens a TCP connection with the interface unit 514 using network address 1 (as shown by flow 602). This TCP connection may acts as a tunnel TCP session for the clients 502 and 504 to access server 518. When client 502 wants to establish a TCP connection with server 518, it sends a TCP open network address 2 request 604A which is intercepted by the interface unit 508 and then transferred to interface unit 514 as shown by flow 604B. This request is read by interface unit 514 and then opens a TCP connection with server 518 on behalf of client using network address 3 (as shown by 604C). Flows 604A, 604B and 604C comprise the TCP connection from the remote client 502 to the private network server 518.

Next, when client 502 wants to send data across the open network address 2; the client sends the TCP data to interface unit 508 via flow 606A. This data is then shipped to interface unit 514 on the already established session (see flow 602) using the flow shown by 606B. Interface unit 514 then pipes this message on to server 518 using flow 606C. Accordingly, flows 606A, 606B and 606C comprise the data write from the client 502 to server 518. Similarly, flows 608A, 608B and 608C comprise the data flow from Server 518 to client 502.

If client 502 wants to close a connection with server 518, it may send a close connection request to interface unit using flow 610A. The interface unit 508 transforms this request and sends it to interface unit 514 using the tunnel already created (i.e., flow 602) as shown by flow 610B. The interface unit then closes the connection with server 518 using flow 610C.

Similar to client 502, if the client 504 wants to communicate with server 518, then the client 504 opens a network connection with interface unit 508 to communicate to server 518 using the flow 612A. Interface unit 508 already has a TCP connection with 514 and it can transform the TCP packets from the client 504 to server 518 using this tunnel. As a result, the interface unit transforms the TCP open request by client 504 to server 518 as an open connect request data packet in network address 1 (as shown by flow 612B). The interface unit 514 then opens a TCP connection with server 518 shown by flow 612C. Similarly, the data flow from client 504 to server 518 is shown by flows 614A, 614B and 614C. Data flow from server 518 to client 504 is shown by flows 616A, 616B and 616C. Connection close from client 504 to server 518 is shown by flows 618A, 618B and 618C which is similar to connection close by client 502 to server 518 shown by flows 610A, 610B and 610C.

Figure 10A:
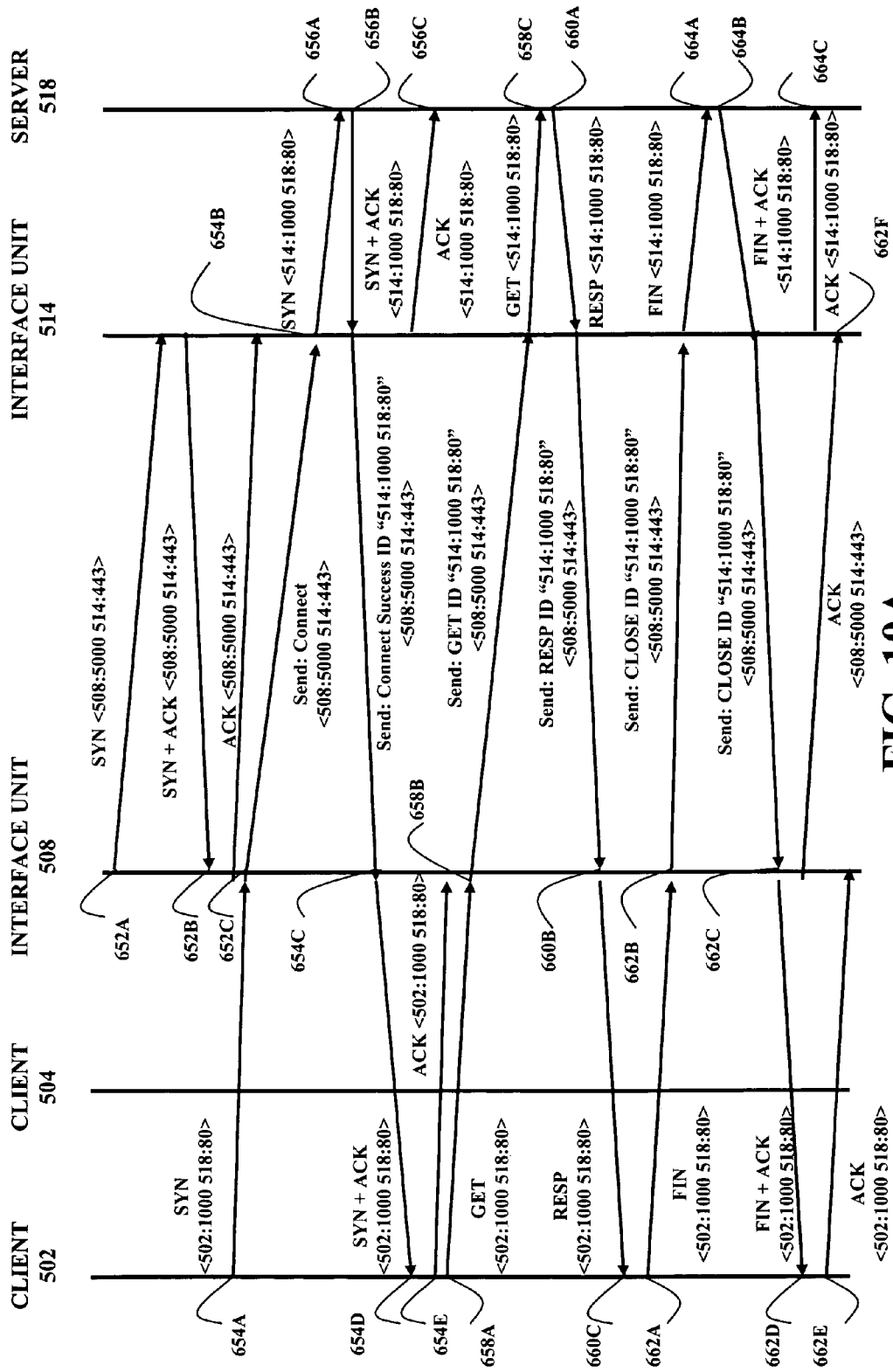
FIGS. 10A and 10B shows a detail flow diagram illustrating the example shown in FIGS. 9A and 9B with TCP packet flow between the client and client side interface unit, the two interface units, and the server side interface unit and the server in accordance with an embodiment.
Figure 10B:
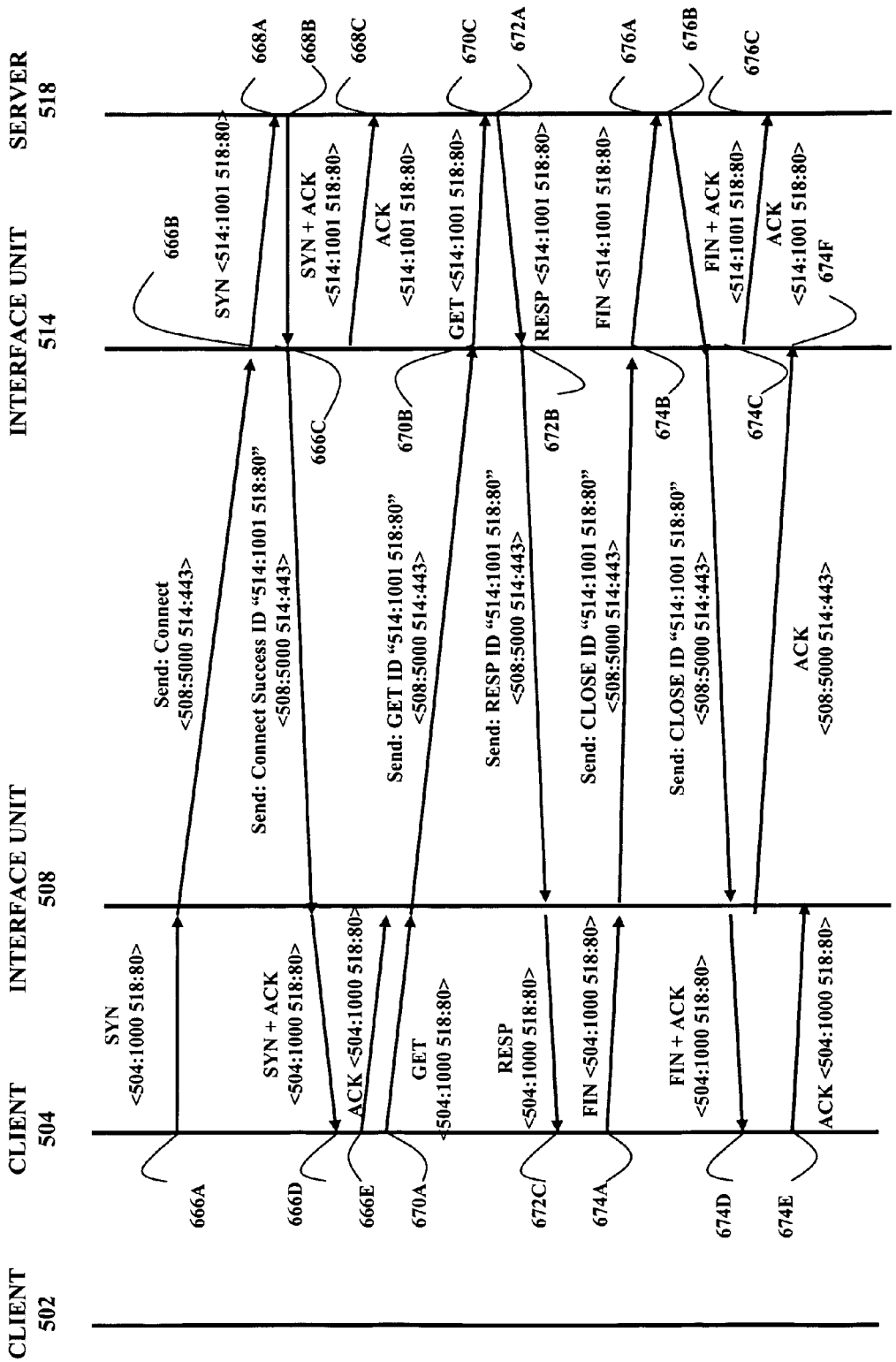

FIGS. 10A and 10B show a detailed flow diagram illustrating the TCP packet flow in accessing the private network server performed by the embodiment set forth in FIGS. 9A and 9B. The flow in FIGS. 10A and 10B correspond to flows 602 through 618 depicted in FIGS. 9A and 9B. More particularly, flows 652A, 652B and 652C corresponds to flow 602, and present the TCP packet flow between interface unit 508 and interface unit 514 while opening a TCP network connection between them. This connection is identified by the exemplary four tuple <508:5000 514:443>, which means interface unit 508 is peer 1 connected on port 5000 with peer 2 denoted as interface unit 514 connected on port 443. This connection may be used by interface unit 508 and 514 to tunnel the data from client 502 and 504 to server on private network 518 or visa versa.

Flow 654A corresponds to a connection open request from client 502 to server 518 on port 80. This request is intercepted by interface unit 508 and sent as a "Connect" request to the interface unit 514 as shown by flow 654B. Interface unit 514 then opens a TCP network connection with server 518 as shown in flows 656A, 656B and 656C. This connection is identified by the four tuple <514:1000 518:80>. Flows 656A, 656B and 656C correspond to the network address open 604C of FIG. 9A. Interface unit 514 then transfers the connection ID as the four tuple <514:1000 518:80> to interface unit 508, as shown in flow 654C. Interface unit 508 transfers the message to the client 502 with connection success as shown in the flows 654D and 654E. This connection establishment flow of open network address 1 shown in flow 604A of FIG. 9A is shown as flows 654A, 654D, and 654E.

The data request from client 502 is shown in flow 658A, which is transferred by interface unit 508 to the interface unit 514 as Send command with ID <514:1000 518:80> as shown in flow 658B. This request is forwarded by interface unit 514 to the server 518 as shown in flow 658C on the network connection with four tuple as <514:1000 518:80>. Server 518 responds with the data as shown in flow 660A. This response is then forwarded by interface unit 514 to interface unit 508 as shown in flow 660B. Interface unit 508 then forwards the response to the client as shown in the flow 660C.

When client 502 wishes to close the connection, it sends a TCP FIN packet to the server 518 as shown in flow 662A. This packet is intercepted by interface unit 508 which forwards the request to the interface unit 514 with the connection ID as <514:1000 518:80> as shown in flow 662B. Interface unit 514 then closes the network connection between itself and the server 518 with FIN as shown in flow 664A. Once server 518 also closes the connection from its side as shown in flow 664B. Interface unit 514 then sends the close message from the server to the interface unit 508 as shown in flow 662C. This message is forwarded by the interface unit 508 to the client 502 in flow 662D and the connection 502:1000 518:80 is thereby terminated.

In a similar fashion client 504 may also open a connection with server 518, which is relayed by the respective interface agents in between; as shown in flows 666A, 666D and 666E between client 504 and interface unit 508. Interface unit 508 and interface unit 514 communicate the connect request and response in the manner shown in flows 666B and 666C. Interface unit 514 then establishes a connection with the server 518 on behalf of the client 504 as shown in flows 668A, 668B and 668C. The data transfer from client 504 to server 518 is interjected by interface units 508 and 514, as shown in flows 670A, 670B and 670C. The response from the server is set forth in flows 672A, 672B, and 672C. When client 508 issues a close call on the network connection <504:100 518:80>, the connection close between client 504 with interface unit 508 is shown by flows 674A, 674D and 674E, the connection close transfer request is shown by flows 674B, 674C and 674F, the connection close between interface unit 514 and server 518 is shown by flows 676A, 676B and 676C, the complete flow is shown by flows 674A, 674B, 676A, 676B, 674C, 676C and flows 674D, 674E and 674F.

Figure 11:
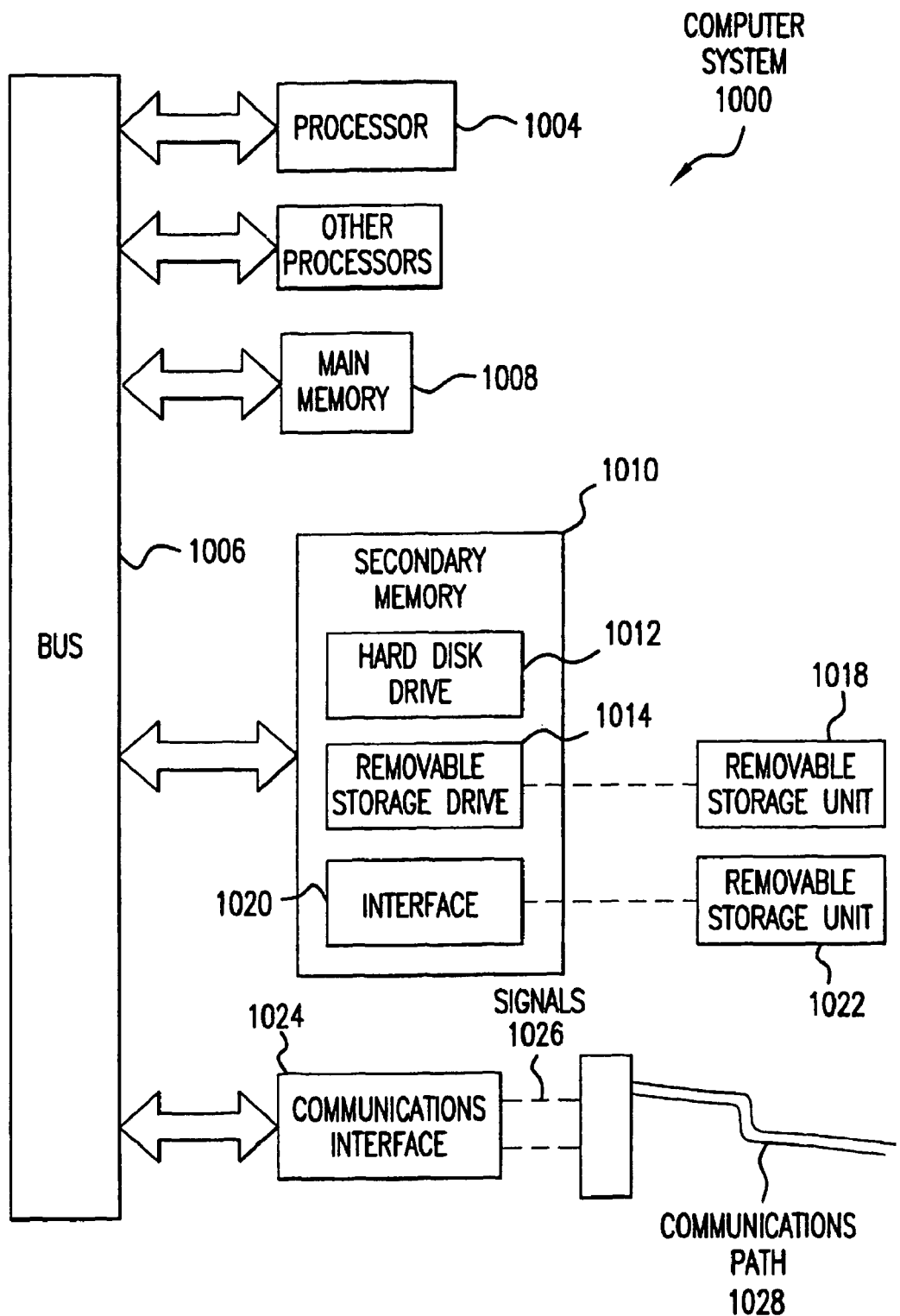
FIG. 11 is a block diagram of an exemplary computer system that may be used to implement various embodiments described herein.

Embodiments of the present invention may be implemented using hardware, software or a combination thereof and may be implemented in a computer system or other processing system. In one embodiment, the invention may be directed toward one or more computer systems capable of carrying out the functionality described herein. An exemplary computer system 1000 is shown in FIG. 11. The computer system 1000 includes one or more processors, such as processor 1004. The processor 1004 is connected to a communication bus 1006. Various software embodiments are described in terms of this example computer system. After reading this description, it will become apparent to a person skilled in the relevant art how to implement the invention using other computer systems and/or computer architectures.

Computer system 1000 also includes a main memory 1008, preferably random access memory (RAM), and can also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well-known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1018 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCM-CIA slot and card, and/or a wireless communication card. Software and data transferred via communications interface 1024 may be in the form of signals, which can be electronic, electromagnetic, optical or other signals capable of being received by communications interface 1024. These signals 1026 may be provided to communications interface via a channel 1028. This channel 1028 carries signals 1026 and may be implemented using wire or cable, fiber optics, a phone line, a cellular phone link, an RF link and other communications channels.

In this document, the terms "computer program product," "computer program medium," and "computer usable medium" may be used to generally, refer to media such as removable storage device 1018, a hard disk installed in hard disk drive 1012, and signals 1026. These computer program products may be used as a means for providing software to computer system 1000.

Computer programs (also called computer control logic) may be stored in main memory and/or secondary memory 1010. Computer programs may also be received via communications interface 1024. Such computer programs, when executed, enable the computer system 1000 to perform the features of the present invention as discussed herein. In particular, the computer programs, when executed, may enable the processor 1004 to perform the features of the present invention. Accordingly, such computer programs may represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention may be implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

In the foregoing implementations may have been described in reference to embodiments that increase the performance and reduction of bandwidth of client communicating to the other network server using interface unit where the primary networking protocol is TCP/IP and the tunnel to communicate to other network server is also TCP/IP. It should be understood that embodiments and implementations of the present invention need not be limited to any particular embodiment or computer network. Therefore, the previous description the embodiments were for purposes of illustration and not limitation.

Based on the foregoing description, various embodiments and implementations of a system, method and computer program product for communicating with a private network may now be described. In one embodiment, a request for initiating a communication with a node coupled to a private network may be intercepted from an application of a client (e.g., application layer) before the request can be received by a transport layer of the client (such as e.g., the TCP/IP protocol layer of a client sub-system). The intercepted request may then be sent to an interface unit coupled to the private network via a pre-established network connection over a public network. After receiving the request, the interface unit may attempt to establish a communication link with the node over the private network. If the interface unit is able to establish a communication link with the node, a unique connection identifier may be received from the interface unit via the pre-established network connection over the public network. The connection identifier is associated with the communication link established over the private network between the interface unit and the node. A subsequent communication from the application of the client directed at the node may then be intercepted before the communication is received by the transport layer of the client. This communication from the application may then be sent with the connection identifier to the interface unit through the pre-established network connection over the public network. After receipt of the communication with the connection identifier, the interface unit may use the connection identifier to identify the associated communication link over the private network and then forward the communication from the application without the connection identifier to the node over the private network via the associated communication link.

In one embodiment, a communication from the node directed to the application with the connection identifier associated with the communication link may be received from the interface unit via the pre-established network. After receipt of the communication from the node and the connection identifier over the pre-established network connection, the communication from the node may be provided (i.e., forwarded) to the application of the client without the connection identifier. In such an implementation, the communication from the node may be received by the interface unit via communication link over the private network and the interface unit may have included the connection identifier associated with the communication link with the communication from the node prior to transmission over the pre-established network connection.

In another embodiment, a termination request for terminating the communication with the node may be intercepted from the application of the client before the request is received by a transport layer of the client. The termination request may then be sent with the connection identifier (that is associated with the communication link between the node and the interface unit) to the interface unit via the pre-established network connection. The application may then be subsequently notified that communication with the node has been terminated after a response has been received from the interface unit (via the pre-established network connection) that indicates that the communication link with the node has been terminated. In such an implementation, the response from the interface unit may include the connection identifier. In such an implementation, the interface unit, after receiving the termination request with the connection identifier, may use the connection identifier to identify the communication link with the node, close the identified communication link to the node, and transmit the response via the pre-established network connection.

In one embodiment, a determination may be made as to whether the pre-established network connection has been established with the interface unit prior to sending of the request or command to the interface unit. If the pre-established network connection has not been established with the interface unit, then a network connection may then be established with the interface unit prior to sending of the request or command to the interface unit.

In one implementation, the request and/or the communication from the application of the client may comprise a Transmission Control Protocol (TCP) operation directed to the transport layer of the client. In another implementation, the pre-established network connection may comprises a TCP tunnel (e.g., a TCP socket) established over the public network. In yet another implementation, the pre-established network connection may be encrypted, (e.g., communications over the pre-established network connection are encrypted). In such an implementation, the pre-established network connection may be encrypted utilizing a secured sockets layer encryption protocol (SSL). In a further implementation, the communication link between the interface unit and the node over the private network may comprise a Transmission Control Protocol/Internet Protocol (TCP/IP) connection.

In one embodiment, the request, the communication, and/or the termination request from the application may be transmitted over the pre-established network connection encapsulated a single packet. In such an embodiment, the connection identifier may be included in the packet.

In another embodiment, the application may be monitored for the issuance of TCP operations to the network layer of the client. In a further embodiment, a network connection over the public network may be established with one or more an additional interface units coupled to the same or different private networks.

In one implementation, the interface unit may establish a unique communication link with the node over the private network and assign a corresponding unique connection identifier for each request that is intercepted from the application of the client and sent to the interface unit over the pre-established network connection over the pubic network. In another implementation, one or more subsequent requests from the application to establish a new connection with the node that are intercepted and sent to the interface unit via the pre-established network connection may be associated with the connection identifier so that subsequent intercepted communications from the application directed to the new connections are send to the node via the same previously established communication link. In a further implementation, the interface unit may maintain a group of one or more pre-established communication links with the node over the private network, each pre-established communication link being associated with a corresponding unique connection identifier, and wherein the communication link (and associated connection identifier) is selected from a group of one or more pre-established communication links between the interface unit and the node over the private network.

In one embodiment, the connection identifier may be generated using information based on at least one of a network address of the node. In another implementation, the connection identifier may be generated by the interface unit from a four tuple of a private side IP address and port of the interface unit and an IP address and port of the node. In yet another implementation, the request from the application may be identified for interception by one or more of a source port, a source IP address, a destination port, and a destination IP address.

In one embodiment, communications from the application that are not directed to the node may be permitted to be received by the network layer of the client.

In one embodiment, the established network connection may be selected from a group of one or more pre-established network connections with the interface unit over the public network. In another embodiment, a second request from an application of a client for initiating a second communication with the private network may be intercepted before the second request can be received by a transport layer of the client. In this embodiment, a second network connection with the interface unit may be established over the public network and the second request may be sent to the interface unit via the second established network connection. In further embodiment, the second request to the interface unit may be sent via the already established network connection.

In one embodiment, an application of a client may be monitored for TCP operations to a network layer of the client for communicating with a node coupled to a private network. The TCP operations from the monitored application of the client intended for the node may then be intercepted before the TCP operations are received by the transport layer of the client. Each TCP operation may be sent in a packet with a connection identifier to an interface unit coupled to the private network via a TCP tunnel over a public network. The connection identifier may be associated with a TCP connection that is established over the private network between the interface unit and the node. For each packet, the interface unit may extract the TCP operation and connection identifier from the packet and then use the connection identifier received in the packet to identify the associated TCP connection over the private network and then forward/relay the TCP operation without the connection identifier to the node via the identified associated TCP connection.

In another embodiment, a network connection over a public network may be established with an agent or hook residing on a client. The client may has an application residing thereon that issues a request for initiating a communication with a node coupled to a private network. The agent intercepts the request from the application before the request can be received by a transport layer of the client. In this embodiment, the intercepted request are received from the agent via the established connection. Next, a communication link with the node may be established over the private network and a connection identifier may be associated with the established communication link. A notification (that includes the connection identifier) may then be sent to the agent that indicates the communication link with the node has been established.

In one embodiment, a communication system may be implemented that includes a private network, a node coupled to the private network and a public network. The system may also include an interface unit coupled to the public network and the private network. The system may further include a client having an application that is capable of issuing a request for initiating a communication with the private network/node. An agent or hook may also reside on the client. The hook may establish a network connection with the interface unit over the public network. The agent may also be capable of intercepting a requests from the application before the request can be received by a transport layer of the client. The agent may then send the request to the interface unit via the established network connection. In such an embodiment, the interface unit may attempt to establish a communication link with the node over the private network after receiving the request. Once the interface unit establishes a communication link with the node over the private network in response to receiving the intercepted request from the hook, the interface unit may associate a connection identifier with the established communication link. The interface unit may then send a notification to the hook that indicates the communication link with the node has been established. This notification may also include the connection identifier. After receiving the notification from the interface unit, the agent may notify the application that a connection has been established with the node. Subsequently, the agent may intercept a subsequent communication from the application of the client directed at the node before the subsequent communication can be received by the transport layer of the client. The agent may then send the subsequent communication with the connection identifier to the interface unit through the established network connection over the public network. After receipt of the subsequent communication with the connection identifier from the hook, the interface unit may use the connection identifier to identify the associated communication link and then forward the subsequent communication to the node via the associated communication link.

In accordance with the embodiments previously discussed, in a computer network, methods may be executed by a client hook agent and methods may be executed by the interface unit to obtain performance improvements for TCP operations from remote client to the private network over TCP tunnel. In one implementation, a network connection may be opened between a client hook agent and an interface unit. TCP operations may then be received from a client to open network connection to a private network server. The TCP operations may then be sent from the client hook to the interface unit to perform the operations on the private network server. TCP operations and/or responses sent from the interface unit may be received by the client hook agent and the responses of the TCP operation may then be sent from the client hook agent to the client.

In another implementation, a TCP connect request may be received from the client application by the client hook and then sent over the connection between the client hook agent and the interface unit. The TCP connect request may be received at the interface unit sent by the client hook agent and a network connection may then be opened between the interface unit and the private network server. A connection identifier (CID) for this connection between the interface unit and the private network machine may be generated that corresponds to the connection from the client side. The connection response with the CID may then be sent from interface unit to the client hook agent so that the client hook agent can use the same CID to locate the client side to inform the connect request is successful.

In a further implementation, data write command may be received from the client application by the client hook and sending it to the interface unit along with the CID associated with the client side connection. The data sent by the client hook agent may be received at the interface unit. The interface may locate the private network side connection with the help of CID and then relay the data on that identified connection. Next, data for the client—if any—may be received from the private network side. This data may then be sent to the client hook agent from the interface unit using the CID.

In yet another implementation, a close connection request may be received from the client by the client hook which then sends it to the interface unit along with the CID. The close connection request may be received from the client hook agent by the interface unit. The interface unit may locate the private network side connection using the CID and send the close connection to the identified private network side connection. A close call response may be received by the interface unit from the private network server. The interface unit may send, the close call response to the client hook agent which may then send it to the to the client.

In one implementation, in response to a new connection request to the private network being received from the client, the client hook agent can send the connect request to the interface unit on the same connection between the client hook agent and the interface unit. With such an implementation, a plurality of network connections from the client to the private network may be transferred by the client hook agent to the interface unit on a single connection between the client hook application and the interface unit.

In another implementation, in response to new connection requests being received from the client to the private network, the client hook agent may open a new connection to the interface unit, such that a new connection is opened between client hook and the interface unit for every connection between the client and the private network for transferring connection operations.

In yet another implementation, in response to receiving new connection requests from the client to the private network, the client hook agent may decide to open a new connection or to send the request on the existing connections by maintaining a pool of connections between the client hook application and the interface unit.

In a further implementation, the client hook agent may maintain connections to different interface units in order to send client requests to different interface units, depending on the private network machine behind the interface units.

In even yet another implementation, a unique connection identifier may be generated to identify the client side connection as follows. A connection request may be received from client hook agent at an interface unit. The interface unit may then open a network connection to the private network server from the interface unit. When the connection response is received from the private network server, the interface unit may generate a connection identifier (CID) from a four tuple of interface unit's private side IP address and port, and private network server's IP address and port. The interface unit may then use this connection identifier to correspond to the client connection sent by the client hook agent to locate the private network side connection and correlate it with the client side connection. The interface unit may also send the connection identifier to the client hook agent. The client hook agent may then use the unique connection identifier sent by the interface unit to use and identify the client side connection by sending it to the interface unit every time when a connection operation directed to the private network side connection is sent to the interface unit.

In one implementation, a TCP connection request from the client to the remote network may be intercepted with the help of a client hook so that it can be transferred to the interface unit. In one such implementation, the client hook may identify which request should go over the tunnel based on the source port, or source IP address, or Destination IP address, or Destination Port or any combination thereof.

In one implementation, multiple clients may be connected to a private network node using an interface unit at the clients' end that is capable of communicating with an interface unit at the private network's end using a public network. In such an implementation, the interface unit at the clients' end may intercept all TCP segments meant for a private network node and transform each of these TCP segments into requests directed to the private network's interface unit via the already established connection over public network. The request/command received by the interface unit at the clients' end from the interface unit at the private network's end (via the network connection established over public network) may then be provided to the respective client machine by sending out a TCP segment destined to the client via the client network. Requests/commands received by the private network side's interface unit at from the client side's interface unit over the network connection established over the public network may be forwarded to the node.

While the above is a complete description of preferred embodiments of the invention, various alternatives, modifications and equivalents may be used. It should be evident that the present invention is equally applicable by making appropriate modifications to the embodiments described above. For example, although the embodiments have been described individually, many of the embodiments may be combined to further increase performance. Therefore, the above description should not be taken as limiting the scope of the invention which is defined by the metes and bounds of the appended claims along with their full scope of equivalents.

What is claimed is:

1. A method for communicating with a private network, comprising:

intercepting a request from an application of a client before the request can be received by a transport layer of the client, the request being for initiating a communication with a node coupled to the private network;

transforming the request such that when the request is sent via an established network connection over a public network to an interface unit coupled to the private network, the interface unit attempts to establish a communication link with the node over the private network after receiving the request, wherein the transport layer of the client does not attempt to establish the communication link with the node due to the transforming;

sending the request to the interface unit coupled to the private network via the established network connection over the public network, wherein the interface unit attempts to establish the communication link with the node over the private network after receiving the request;

receiving a unique connection identifier from the interface unit via the established network connection over the public network if the interface unit is able to establish the communication link with the node, wherein the connection identifier identifies the communication link established over the private network between the interface unit and the node;

intercepting a communication from the application of the client, the intercepted communication being directed at the node, the communication from the application being intercepted before the communication can be received by the transport layer of the client; and sending the communication from the application with the connection identifier to the interface unit through the established network connection over the public network, wherein after receipt of the communication with the connection identifier, the interface unit uses the connection identifier to identify the communication link and send the communication from the application to the node via the associated communication link.

2. The method of claim 1, further comprising intercepting a termination request for terminating the communication with the node from the application of the client before the request is received by the transport layer of the client; sending the termination request with the connection identifier to the interface unit via the established network connection; and notifying the application that communication with the node has been terminated after receiving a response from the interface unit via the established network connection that indicates that the communication link with the node has been terminated.

3. The method of claim 2, wherein the response from the interface unit includes the connection identifier.

4. The method of claim 3, wherein the interface unit, after receiving the termination request with the connection identifier, uses the connection identifier to identify the communication link with the node, closes the identified communication link to the node, and transmits via the established network connection the response via the established network connection.

5. The method of claim 1, further comprising receiving from the interface unit via the established network connection a communication from the node with the connection identifier, and providing the communication from the node to the application.

6. The method claim 5, wherein the communication from the node was received by the interface unit via communication link over the private network, wherein the interface unit included the connection identifier associated with the communication link with the communication from the node prior to transmission over the established network connection.

7. The method of claim 1, wherein the established network connection over the public network is encrypted.

8. The method of claim 7, wherein the established network connection is encrypted utilizing secure socket layer (SSL).

9. The method of claim 1, wherein transforming comprises: encapsulating the request from the application in a single packet and transmitting the request over the established network connection in the single packet such that the transport layer of the client does not attempt to establish the communication link with the node.

10. The method of claim 9, wherein the connection identifier is included in the packet.

11. The method of claim 1, further comprising determining whether the established network connection has been established with the interface unit.

12. The method of claim 1, wherein at least one of the request and the communication from the application of the client comprises a TCP operation.

13. The method of claim 1, wherein the established network connection comprises a TCP tunnel.

14. The method of claim 1, wherein the communication link between the interface unit and the node over the private network comprises a transport control protocol/Internet protocol (TCP/IP) connection.

15. The method of claim 1, wherein the application is monitored for the issuance of TCP operations to the transport layer of the client.

16. The method of claim 1, wherein the interface unit establishes a unique communication link with the node over the private network and assigns a corresponding unique connection identifier for each request that is intercepted from the application of the client and sent to the interface unit over the established network connection over the public network.

17. The method of claim 1, wherein one or more subsequent requests from the application to establish a new connection with the node that are intercepted and sent to the interface unit via the established network connection are associated with the connection identifier so that subsequent intercepted communications from the application directed to the new connections are sent to the node via the same communication link.

18. The method of claim 1, wherein the communication link is selected from a group of one or more established communication links between the interface unit and the node over the private network.

19. The method of claim 1, further comprising establishing a network connection over the public network with an additional interface unit coupled to the private network.

20. The method of claim 1, wherein the connection identifier is generated using information based on at least one of a network address of the node.

21. The method of claim 1, wherein the connection identifier is generated by the interface unit from a four tuple of a private side IP address and port of the interface unit and an IP address and port of the node.

22. The method of claim 1, wherein the request from the application is identified for interception by one or more of a source port, a source IP address, a destination port, and a destination IP address.

23. The method of claim 1, wherein communications from the application that are not directed to the node are permitted to be received by the transport layer of the client.

24. The method of claim 1, further comprising intercepting a second request from a second application of a second client for initiating a second communication with the private network before the second request can be received by a transport layer of the second client, establishing a second network connection with the interface unit over the public network, and sending the second request to the interface unit via the second established network connection.

25. The method of claim 1, further comprising intercepting a second request from a second application of a second client for initiating a second communication with the private network before the second request can be received by a transport layer of the second client, sending the second request to the interface unit via the established network connection.

26. The method of claim 1, wherein the established network connection is selected from a group of one or more pre-established network connections with the interface unit over the public network.

27. The method of claim 1, wherein the established network connection comprises a TCP tunnel, the communication from the application of the client is TCP data, and the intercepting of the communication from the application comprises sending information over the TCP tunnel without introducing latency involved in transferring excess TCP information.

28. A system for communicating with a private network, comprising:
   logic that intercepts a request from an application of a client for initiating a communication with a node coupled to a private network, the request being intercepted before the request can be received by the transport layer of the client;
   logic that transforms the request such that when the request is sent via an established network connection over a public network to an interface unit coupled to the private network, the interface unit attempts to establish a communication link with the node over the private network after receiving the request, wherein the transport layer of the client does not attempt to establish the communication link with the node due to the transforming;
   logic that sends the request to the interface unit coupled to the private network via the established network connection over the public network, wherein the interface unit attempts to establish the communication link with the node over the private network after receiving the request;
   logic that receives a unique connection identifier from the interface unit via the established network connection over the public network if the interface unit is able to establish the communication link with the node, wherein the connection identifier is associated with the communication link established over the private network between the interface unit and the node;
   logic that intercepts a communication from the application of the client directed at the node, the communication from the application being intercepted before the communication can be received by the transport layer of the client; and
   logic that sends the communication from the application with the connection identifier to the interface unit through the established network connection over the public network, wherein after receipt of the communication with the connection identifier, the interface unit uses the connection identifier to identify the associated communication link and sends the communication from the application to the node via the associated communication link.

29. A system for communicating with a private network, comprising:
   an interface unit;
   a client capable of communicating with the interface unit;
   wherein the client includes a non-transitory computer usable storage medium storing computer code that:

intercepts a request from an application of the client for initiating a communication with a node coupled to the private network before the request is received by a transport layer of the client;

transforms the request such that when the request is sent via an established network connection over a public network to an interface unit coupled to the private network, the interface unit attempts to establish a communication link with the node over the private network after receiving the request, wherein the transport layer of the client does not attempt to establish the communication link with the node due to the transforming;

sends the request to the interface unit coupled to the private network via the established network connection over the public network, wherein the interface unit attempts to establish the communication link with the node over the private network after receiving the request;

receives a unique connection identifier from the interface unit via the established network connection over the public network if the interface unit is able to establish the communication link with the node, wherein the connection identifier is associated with the communication link established over the private network between the interface unit and the node;

intercepts a communication from the application of the client directed at the node before the communication is received by the transport layer of the client; and sends the communication from the application with the connection identifier to the interface unit through the established network connection over the public network, wherein after receipt of the communication with the connection identifier, the interface unit uses the connection identifier to identify the associated communication link and sends the communication from the application to the node via the associated communication link.

30. A method of communicating with a private network, comprising:

intercepting a request from an application of a client for initiating a communication with a node coupled to the private network before the request can be received by a transport layer of the client;

transforming the communication such that when the request is sent via an established network connection over a public network to an interface unit coupled to the private network, the interface unit attempts to establish a communication link with the node over the private network after receiving the request, wherein the transport layer of the client does not attempt to establish the communication link with the node due to the transforming, and wherein a connection identifier is received from the interface unit via the established network connection over the public network if the interface unit is able to establish the communication link with the node;

monitoring the application of the client for communications intended for the node;

intercepting a communication from the monitored application of the client intended for the node before the communication is received by the transport layer of the client; and sending the communication with the connection identifier to the interface unit coupled to the private network via the established network connection over the public network, wherein the connection identifier is associated with the communication link established over the private network between the interface unit and the node, wherein the interface unit uses the connection identifier received with the communication to identify the associated communication link over the private network and then sends the communication without the connection identifier to the node via the associated communication link.

31. A method of communicating with a private network, comprising:

monitoring an application of a client for TCP operations to a network layer of the client for communicating with a node coupled to the private network;

intercepting the TCP operations from the monitored application of the client, in order to reduce latency involved in transferring excess TCP information, the TCP operations intended for the node, the TCP operations intercepted before the TCP operations are received by a transport layer of the client;

transforming a first TCP operation to be included in a packet such that when the first TCP operation is sent via a TCP tunnel over a public network to an interface unit coupled to the private network, the interface unit attempts to establish a TCP connection with the node over the private network after receiving the request, wherein the transport layer of the client does not attempt to establish the TCP connection with the node due to the transforming, and wherein a connection identifier is received from the interface unit via the TCP tunnel over the public network if the interface unit is able to establish the TCP connection with the node; and sending a second TCP operation in a packet with the connection identifier to the interface unit coupled to the private network via the TCP tunnel over the public network, wherein the connection identifier is associated with the TCP connection established over the private network between the interface unit and the node, wherein for the second TCP operation in the packet, the interface unit extracts the second TCP operation and connection identifier from the packet and uses the connection identifier received in the packet to identify the associated TCP connection over the private network and forwards the second TCP operation without the connection identifier to the node via the identified associated TCP connection.

32. The method of claim 31, wherein the intercepting comprises sending information over the TCP tunnel without introducing latency involved in transferring excess TCP information.

33. A method for communicating with a private network, comprising:

establishing a network connection over a public network with an agent residing on a client, wherein the client has an application residing thereon that issues a request for initiating a communication with a node coupled to the private network, wherein the agent intercepts the request from the application before the request can be received by a transport layer of the client and transforms the request such that when the request is received, a communication link is established with the node over the private network after receiving the request, wherein the transport layer of the client does not attempt to establish the communication link with the node due to the transforming;

receiving the intercepted request from the agent via the established connection;

establishing the communication link with the node over the private network;

associating a connection identifier with the established communication link; and sending a notification to the agent that indicates the communication link with the node has been established, the notification including the connection identifier.

34. The method of claim 33, further comprising receiving a packet from the agent via the established network connection, wherein the packet includes the communication identifier and a communication from the application to the node that was intercepted by the agent before the communication could be received by the transport layer of the client.

35. The method of claim 34, further comprising extracting the communication and the connection identifier from the received packet, and using the connection identifier to identify associated communication link, and sending the communication extracted from the packet to the node via the identified communication link over the private network.

36. The method of claim 33, further comprising receiving via the communication link over the private network a packet containing a communication from the node directed to the application of the client, extracting the communication from the node from the packet, sending the communication from the node and the connection identifier associated with the communication line in a packet via the established network connection over the public network to the agent, wherein the agent extracts the communication from the packet sent via the established network connection and provides it to the application of the client.

37. The method of claim 33, wherein the network connection over the public network comprises a TCP tunnel.

38. The method of claim 33, wherein the established network connection is encrypted.

39. The method of claim 33, further comprising establishing a unique communication link with the node over the private network and assigning a corresponding unique connection identifier for each intercepted request received from the agent via the established network connection over the public network.

40. The method of claim 33, wherein one or more subsequent requests from the application to establish a new connection with the node are intercepted by the agent and received from the agent via the established network connection are associated with the connection identifier so that subsequent intercepted communications from the application directed to the new connections are sent to the node via the same communication link.

41. The method of claim 33, further comprising maintaining a group of one or more pre-established communication links with the node over the private network, each pre-established communication link being associated with a corresponding unique connection identifier, and wherein the communication link is selected from a group of one or more pre-established communication links with the node over the private network.

42. The method of claim 33, further comprising generating the connection identifier using information based on at least one of a network address of the node.

43. The method of claim 33, further comprising generating the connection identifier from a four tuple of a private side IP address and port of the interface unit and an IP address and port of the node.

44. A system for communicating with a private network, comprising:
logic that establishes a network connection over a public network with an agent residing on a client, wherein the client has an application residing thereon that issues a request for initiating a communication with a node coupled to the private network, wherein the agent intercepts the request from the application before the request can be received by a transport layer of the client and transforms the request such that when the request is received, a communication link is established with the node over the private network after receiving the request, wherein the transport layer of the client does not attempt to establish the communication link with the node due to the transforming;
logic that receives the intercepted request from the agent via the established connection;
logic that establishes a communication link with the node over the private network;
logic that associates a connection identifier with the established communication link; and
logic that sends a notification to the agent that indicates the communication link with the node has been established, the notification including the connection identifier.

45. A system for communicating with a private network, comprising:
a client;
an interface unit capable of communication with the client;
wherein the interface unit includes a non-transitory computer usable storage medium storing computer code that:
establishes a network connection over a public network with an agent residing on the client, wherein the client has an application residing thereon that issues a request for initiating a communication with a node coupled to the private network, wherein the agent intercepts the request from the application before the request can be received by a transport layer of the client and transforms the request such that when the request is received, a communication link is established with the node over the private network after receiving the request, wherein the transport layer of the client does not attempt to establish the communication link with the node due to the transforming;
receives the intercepted request from the agent via the established connection;
establishes a communication link with the node over the private network;
associates a connection identifier with the established communication link; and
sends a notification to the agent that indicates the communication link with the node has been established, the notification including the connection identifier.

46. A communication system, comprising:
a private network;
a node coupled to the private network;
a public network;
an interface unit coupled to the public network and the private network;
a client having an application, wherein the application issues a request for initiating a communication with the node;
an agent residing on the client, wherein the agent establishes a network connection with the interface unit over the public network, wherein the agent intercepts the request from the application before the request can be received by a transport layer of the client, wherein the agent transforms the request such that when the request is received, a communication link is established with the node over the private network after receiving the request, wherein the transport layer of the client does not attempt to establish the communication link with the node due to the transforming and sends the request to the interface unit via the established network connection;

wherein the interface unit attempts to establish a communication link with the node over the private network after receiving the request;

wherein the interface unit establishes a communication link with the node over the private network in response to receiving the intercepted request from the agent, wherein the interface unit associates a connection identifier with the established communication link and sends a notification to the agent that indicates the communication link with the node has been established, wherein the notification includes the connection identifier;

wherein the agent notifies the application that a connection has been established with the node after receiving the notification from the interface unit; and wherein the agent intercepts a subsequent communication from the application of the client directed at the node before the subsequent communication can be received by the transport layer of the client and sends the subsequent communication with the connection identifier to the interface unit through the established network connection over the public network, wherein after receipt of the subsequent communication with the connection identifier from the agent, the interface unit uses the connection identifier to identify the associated communication link and send the subsequent communication to the node via the associated communication link.

* * * * *

UNITED STATES PATENT AND TRADEMARK OFFICE
CERTIFICATE OF CORRECTION

PATENT NO. : 8,250,214 B2  
APPLICATION NO. : 11/019956  
DATED : August 21, 2012  
INVENTOR(S) : Michel Susai, Ritesh Agrawal and Uday Masurekar Page 1 of 1

It is certified that error appears in the above-identified patent and that said Letters Patent is hereby corrected as shown below:

Title Page, item (75), change

"Uday Masuraker"

to

--Uday Masurekar--

Signed and Sealed this
Seventeenth Day of September, 2013

Teresa Stanek Rea  
*Deputy Director of the United States Patent and Trademark Office*